(12) United States Patent
Krueger et al.

(10) Patent No.: US 9,026,941 B1
(45) Date of Patent: *May 5, 2015

(54) SUGGESTING ACTIVITIES

(71) Applicant: Blackwerks, LLC, Glen Ellyn, IL (US)

(72) Inventors: Brett A. Krueger, Rochester Hills, MI (US); Kraig T. Krueger, Glen Ellyn, IL (US)

(73) Assignee: Blackwerks LLC, Glen Ellyn, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,726

(22) Filed: Oct. 15, 2014

(51) Int. Cl.
*G06F 3/048* (2013.01)
*G06F 3/0484* (2013.01)
*G06F 17/30* (2006.01)
*G06K 9/00* (2006.01)
*H04N 21/466* (2011.01)
*H04N 21/25* (2011.01)

(52) U.S. Cl.
CPC ............ *G06F 3/048* (2013.01); *G06F 3/04842* (2013.01); *G06F 17/30* (2013.01); *G06K 9/00335* (2013.01); *H04N 21/4668* (2013.01); *H04N 21/252* (2013.01); *Y10S 715/963* (2013.01)

(58) Field of Classification Search
CPC ..... G06F 3/048; G06F 3/04842; G06F 17/30; H04N 21/252; H04N 21/4668; G06K 9/00335
USPC .......................... 715/812, 963; 705/7.13, 7.15
See application file for complete search history.

(56) References Cited

U.S. PATENT DOCUMENTS

| | | | |
|---|---|---|---|
| 6,323,884 B1* | 11/2001 | Bird et al. ...................... 715/810 |
| 6,850,252 B1* | 2/2005 | Hoffberg ....................... 715/716 |
| 7,233,933 B2* | 6/2007 | Horvitz et al. .................. 706/21 |
| 7,681,146 B2* | 3/2010 | Hawkins et al. .............. 715/816 |
| 8,799,814 B1* | 8/2014 | Bryc et al. ..................... 715/811 |
| 2003/0088463 A1* | 5/2003 | Kanevsky et al. .............. 705/14 |
| 2005/0216848 A1* | 9/2005 | Thompson et al. ........... 715/753 |
| 2007/0299795 A1* | 12/2007 | Macbeth et al. ................ 706/16 |
| 2008/0098313 A1* | 4/2008 | Pollack ......................... 715/753 |
| 2008/0162632 A1* | 7/2008 | O'Sullivan et al. ........... 709/204 |
| 2009/0119167 A1* | 5/2009 | Kendall et al. .................. 705/14 |
| 2009/0158189 A1* | 6/2009 | Itani .............................. 715/772 |
| 2010/0083217 A1* | 4/2010 | Dalal et al. .................... 717/106 |
| 2010/0169343 A1* | 7/2010 | Kenedy et al. ................ 707/758 |
| 2011/0004850 A1* | 1/2011 | Lodico et al. ................. 715/838 |
| 2011/0137836 A1* | 6/2011 | Kuriyama et al. .............. 706/12 |

(Continued)

*Primary Examiner* — Patrick Riegler
*Assistant Examiner* — Nicholas Klicos
(74) *Attorney, Agent, or Firm* — Honigman Miller Schwartz and Cohn LLP; Brett A. Krueger

(57) ABSTRACT

A method includes receiving inputs indicative of a user state of a user. The inputs include sensor inputs from one or more sensors and/or user inputs received from a graphical user interface displayed. The method includes determining a collective user state based on the received inputs and determining one or more possible activities for the user and one or more predicted outcomes for each activity based on the collective user state. The method includes executing one or more behaviors that evaluate the one or more possible activities and/or the corresponding one or more predicted outcomes. Each behavior models a human behavior and/or a goal oriented task. The method further includes selecting one or more activities based on the evaluations of the one or more possible activities and/or the corresponding one or more predicted outcomes and sending results including the selected one or more activities to a screen.

28 Claims, 19 Drawing Sheets

(56) References Cited

U.S. PATENT DOCUMENTS

| | | | |
|---|---|---|---|
| 2011/0230732 A1* | 9/2011 | Edman et al. | 600/301 |
| 2011/0260860 A1* | 10/2011 | Gupta | 340/539.13 |
| 2012/0041907 A1* | 2/2012 | Wang et al. | 706/12 |
| 2012/0124363 A1* | 5/2012 | Dietrich et al. | 713/100 |
| 2013/0073473 A1* | 3/2013 | Heath | 705/319 |
| 2013/0074013 A1* | 3/2013 | Tapiola et al. | 715/859 |
| 2013/0080427 A1* | 3/2013 | Cross et al. | 707/728 |
| 2013/0159413 A1* | 6/2013 | Davis et al. | 709/204 |
| 2013/0197968 A1* | 8/2013 | Davis et al. | 705/7.29 |
| 2013/0290820 A1* | 10/2013 | Dhanani | 715/205 |
| 2014/0075385 A1* | 3/2014 | Wan et al. | 715/812 |
| 2014/0101611 A1* | 4/2014 | Lang et al. | 715/813 |
| 2014/0114896 A1* | 4/2014 | Hawkins et al. | 706/46 |
| 2014/0129499 A1* | 5/2014 | Hawkins | 706/46 |
| 2014/0143026 A1* | 5/2014 | Nies et al. | 705/7.42 |
| 2014/0207801 A1* | 7/2014 | Palmert et al. | 707/749 |
| 2014/0229860 A1* | 8/2014 | Rogers et al. | 715/753 |
| 2014/0249853 A1* | 9/2014 | Proud et al. | 705/3 |
| 2014/0281971 A1* | 9/2014 | Isbell et al. | 715/716 |
| 2014/0310641 A1* | 10/2014 | Kornmann et al. | 715/781 |

* cited by examiner

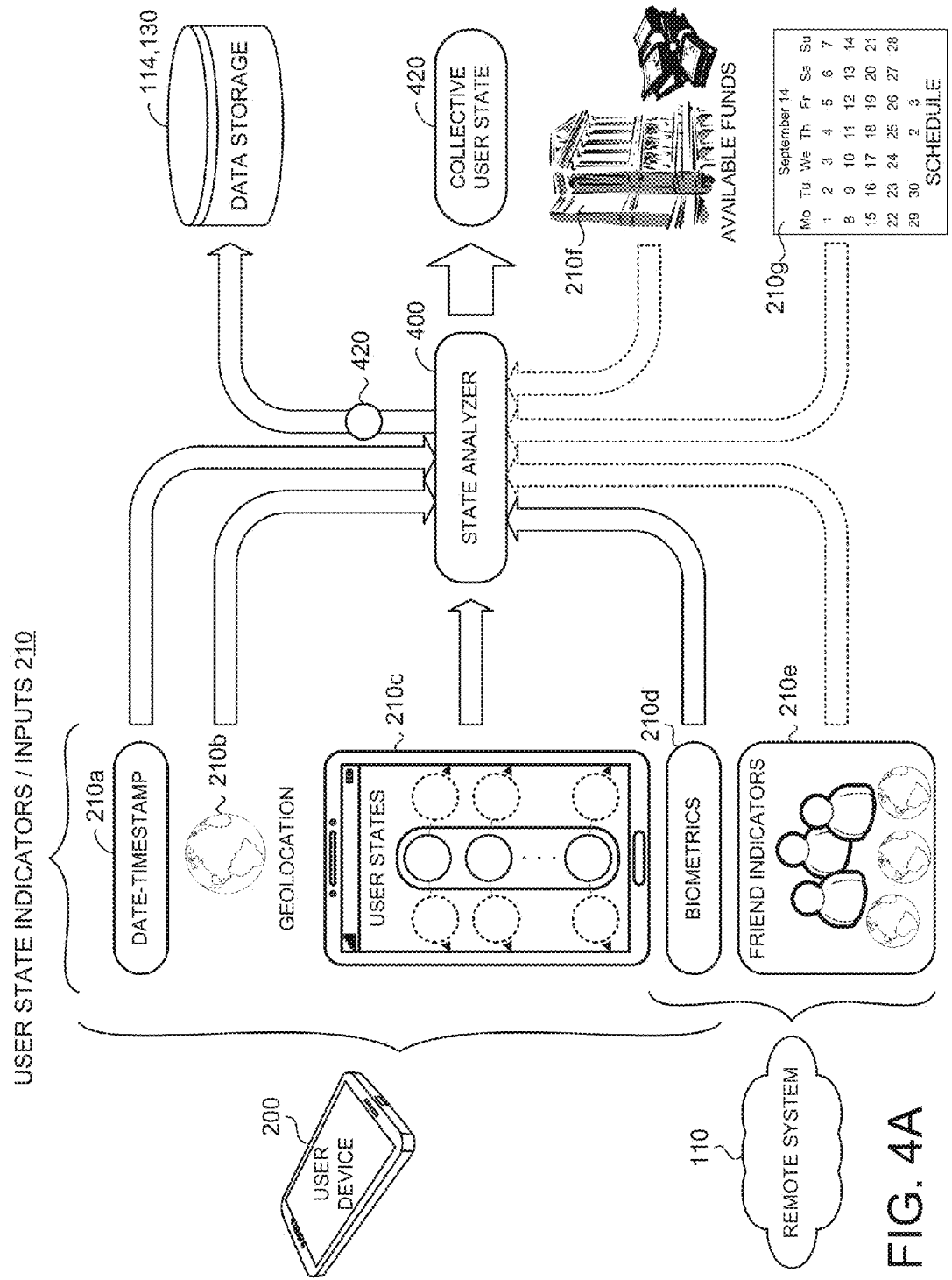

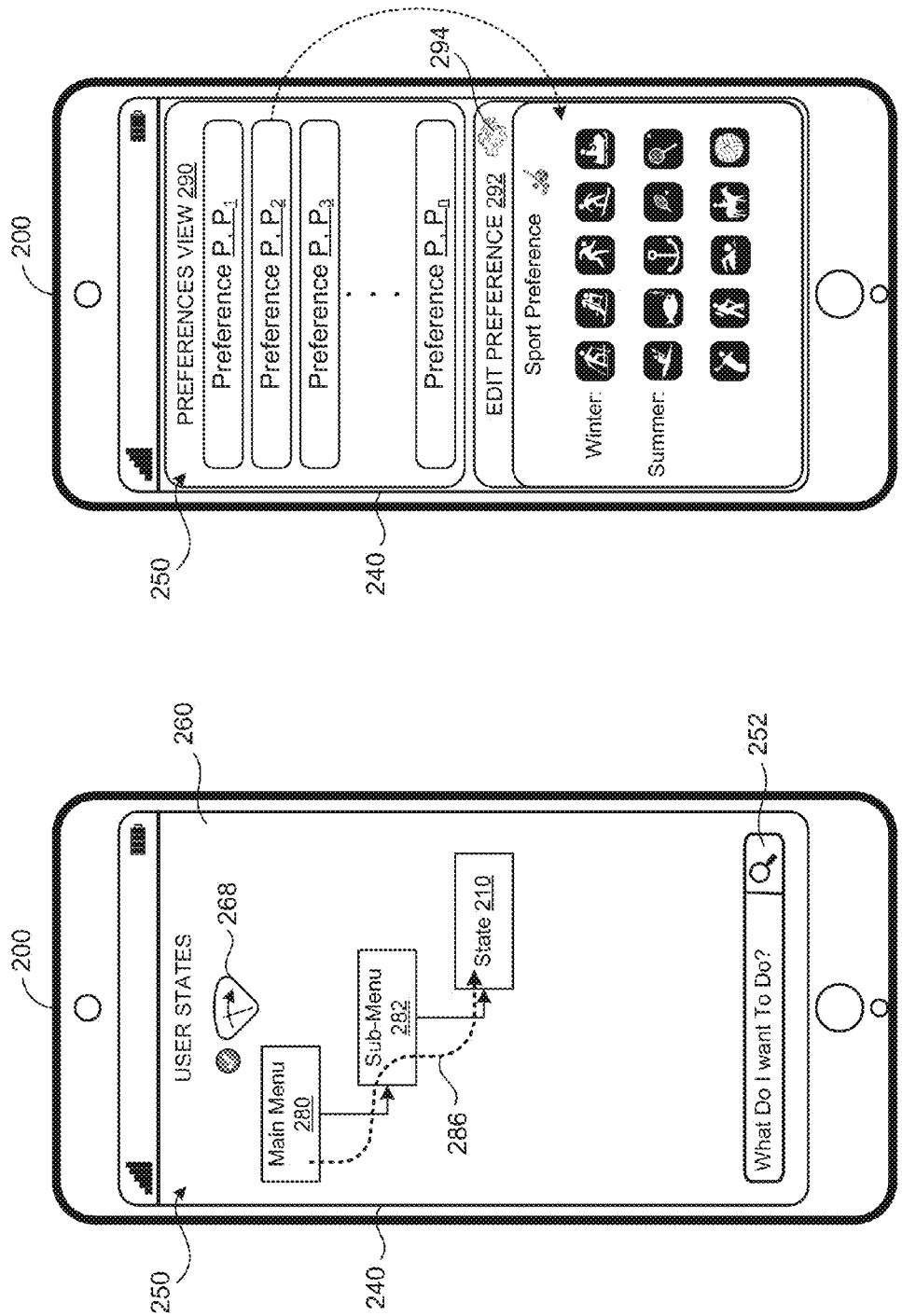

SUGGESTING ACTIVITIES

TECHNICAL FIELD

This disclosure relates to suggesting activities to a user based on an assessment of the user's current state.

BACKGROUND

The use of mobile devices, such as smartphones, tablet PCs, cellular telephones, or portable digital assistants, has become widespread. At their inception, mobile devices were mainly used for voice communication, but recently they have become a reliable source for performing a range of business and personal tasks. Mobile devices are useful to obtain information by using a data connection to access the World Wide Web. The user may input a search query on a search engine website, using the mobile device, to obtain requested information. The information may relate to a location of a restaurant, hotel, shopping center, or other information. Users may use mobile devices for social media, which allows the users to create, share, or exchange information and ideas in virtual communities or networks. Social media depends on mobile and web-based technologies to allow people to share, co-create, collaborate on, discuss, and modify user-generated content.

SUMMARY

One aspect of the disclosure provides a method that includes receiving, at a computing device, inputs indicative of a user state of a user. The inputs include sensor inputs from one or more sensors in communication with the computing device and/or user inputs received from a graphical user interface displayed on a screen in communication with the computing device. The method includes determining, using the computing device, a collective user state based on the received inputs and determining one or more possible activities for the user and one or more predicted outcomes for each activity based on the collective user state. The method includes executing, at the computing device, one or more behaviors that evaluate the one or more possible activities and/or the corresponding one or more predicted outcomes. Each behavior models a human behavior and/or a goal oriented task. The method further includes selecting, using the computing device, one or more activities based on the evaluations of the one or more possible activities and/or the corresponding one or more predicted outcomes and sending results including the selected one or more activities from the computing device to the screen for display on the screen.

Implementations of the disclosure may include one or more of the following optional features. In some implementations, the inputs include biometric data of the user and environmental data regarding a surrounding of the user. The one or more sensors may include at least one of a global positioning system, a temperature sensor, a camera, a three dimensional volumetric point cloud imaging sensor, a fingerprint reader, a blood glucose monitor, a skin PH meter, an inertial measurement unit, a microphone, a blood oxygen meter, a humidistat, or a barometer. Other sensors are possible as well.

In some implementations, the method includes querying one or more remote data sources in communication with the computing device to identify possible activities and/or predicted outcomes. The method may include determining, using the computing device, the one or more possible activities and the one or more predicted outcomes for each activity based on one or more preferences of the user. Each behavior may evaluate an activity or a corresponding outcome positively when the activity or the corresponding outcome at least partially achieves an objective of the behavior. Moreover, each behavior may evaluate an activity or a corresponding outcome positively when the activity or the corresponding outcome at least partially achieves a user preference stored in non-transitory memory in communication with the computing device. In some examples, a first behavior evaluates an activity or a corresponding outcome based on an evaluation by a second behavior of the activity or the corresponding outcome. Each behavior may elect to participate or not participate in evaluating the one or more activities and/or the one or more predicted outcomes for each activity based on the collective user state.

When an input is related to a behavior, the method may include incrementing an influence value associated with the behavior. The input is related to the behavior when the input is of an input type associated with the behavior. In some implementations, the evaluations of each behavior can be weighted based on the influence value of the corresponding behavior. The method may include decrementing the influence value of each behavior after a threshold period of time. When an influence value equals zero, the method may include deactivating the corresponding behavior. Any behaviors having an influence value greater than zero may participate in evaluating the activities or the corresponding outcomes; and any behaviors having an influence value equal to zero may not participate in evaluating the activities or the corresponding outcomes.

In some implementations, the method includes selecting for the results a threshold number of activities having the highest evaluations or a threshold number of activities having corresponding predicted outcomes that have the highest evaluations. The method may include combining selected activities and sending a combined activity in the results.

The computing device may include a user computer processor of a user device including the screen and/or one or more remote computer processors in communication with the user computer processor. For example, the computer device can be the computer processor of a mobile device, a computer processor of an elastically scalable cloud resource, or a combination thereof.

Another aspect of the disclosure provides a system that includes one or more computing devices and non-transitory memory in communication with the one or more computing devices. The non-transitory memory stores instructions that, when executed by the one or more computing devices, cause the one or more computing devices to perform operations that include receiving inputs indicative of a user state of a user. The inputs include sensor inputs from one or more sensors in communication with the one or more computing devices and/or user inputs received from a graphical user interface displayed on a screen in communication with the one or more computing devices. The operations include determining a collective user state based on the received inputs, determining one or more possible activities for the user and one or more predicted outcomes for each activity based on the collective user state, and executing one or more behaviors that evaluate the one or more possible activities and/or the corresponding one or more predicted outcomes. Each behavior models a human behavior and/or a goal oriented task. The operations further include selecting one or more activities based on the evaluations of the one or more possible activities and/or the corresponding one or more predicted outcomes and sending results including the selected one or more activities to the screen for display on the screen.

In some implementations, the inputs include biometric data of the user and environmental data regarding a surrounding of the user. The one or more sensors may include at least one of a global positioning system, a temperature sensor, a camera, a three dimensional volumetric point cloud imaging sensor, a fingerprint reader, a blood glucose monitor, a skin PH meter, an inertial measurement unit, a microphone, a blood oxygen meter, a humidistat, or a barometer. Other sensors are possible as well.

In some implementations, the operations include querying one or more remote data sources in communication with the computing device to identify possible activities and/or predicted outcomes. The operations may include determining, using the computing device, the one or more possible activities and the one or more predicted outcomes for each activity based on one or more preferences of the user. Each behavior may evaluate an activity or a corresponding outcome positively when the activity or the corresponding outcome at least partially achieves an objective of the behavior. Moreover, each behavior may evaluate an activity or a corresponding outcome positively when the activity or the corresponding outcome at least partially achieves a user preference stored in non-transitory memory in communication with the computing device. In some examples, a first behavior evaluates an activity or a corresponding outcome based on an evaluation by a second behavior of the activity or the corresponding outcome. Each behavior may elect to participate or not participate in evaluating the one or more activities and/or the one or more predicted outcomes for each activity based on the collective user state.

When an input is related to a behavior, the operations may include incrementing an influence value associated with the behavior. The input is related to the behavior when the input is of an input type associated with the behavior. In some implementations, the evaluations of each behavior can be weighted based on the influence value of the corresponding behavior. The operations may include decrementing the influence value of each behavior after a threshold period of time. When an influence value equals zero, the operations may include deactivating the corresponding behavior. Any behaviors having an influence value greater than zero may participate in evaluating the activities or the corresponding outcomes; and any behaviors having an influence value equal to zero may not participate in evaluating the activities or the corresponding outcomes.

In some implementations, the operations include selecting for the results a threshold number of activities having the highest evaluations or a threshold number of activities having corresponding predicted outcomes that have the highest evaluations. The operations may include combining selected activities and sending a combined activity in the results.

The computing device may include a user computer processor of a user device including the screen and/or one or more remote computer processors in communication with the user computer processor. For example, the computer device can be the computer processor of a mobile device, a computer processor of an elastically scalable cloud resource, or a combination thereof.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4A is a schematic view of an example state analyzer receiving inputs from various sources.

FIG. 4D is a schematic view of an example user device displaying an example state acquisition view having menus and allowing the user to select one or more user state indicators.

FIG. 4E is a schematic view of an example user device displaying an example user preferences view.

Like reference symbols in the various drawings indicate like elements.

DETAILED DESCRIPTION

Figure 1A:
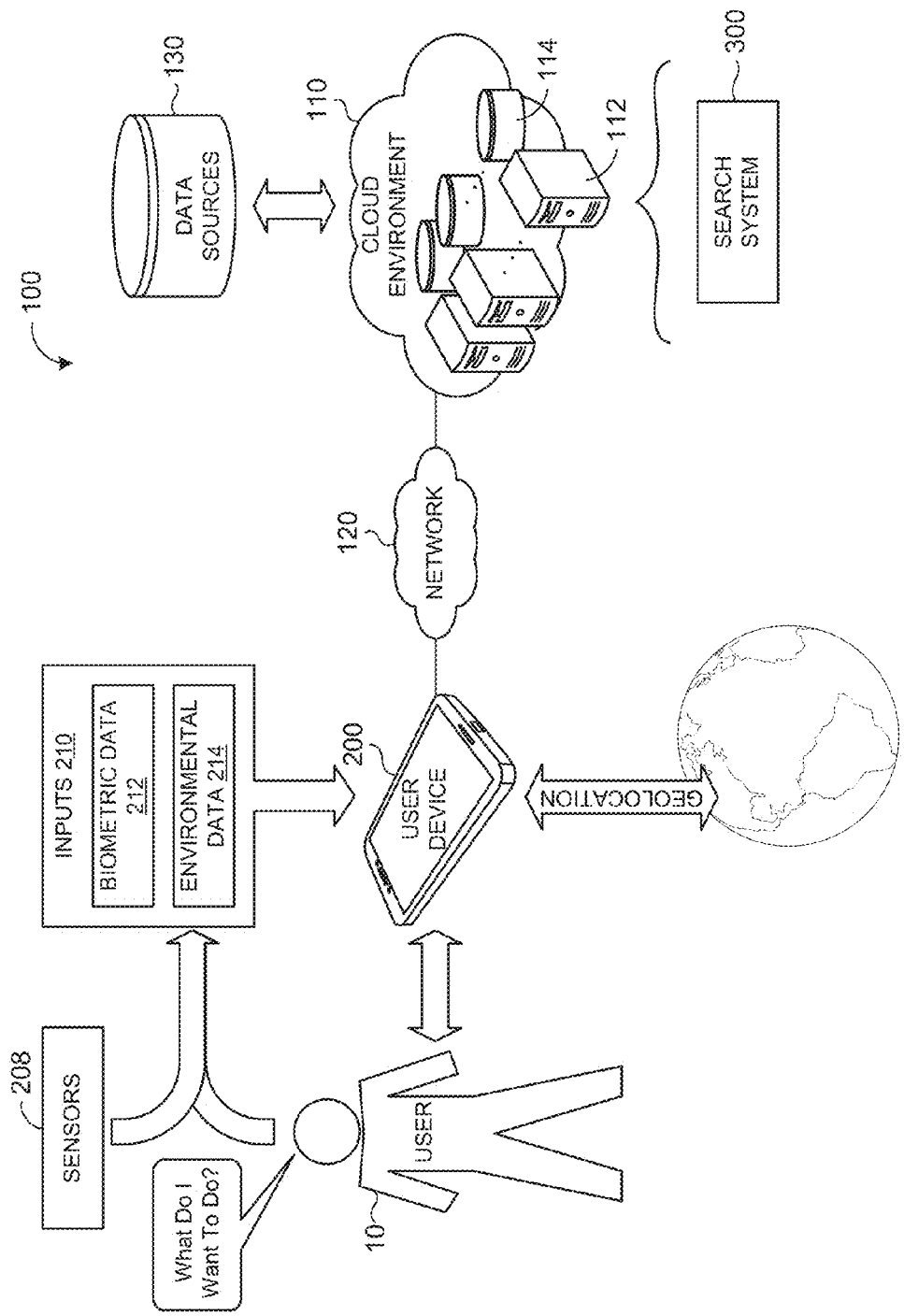
FIG. 1A is a schematic view of an example environment including a user device in communication with a search system.

FIG. 1A illustrates an example system 100 that includes a user device 200 associated with a user 10 in communication with a remote system 110 via a network 120. The remote system 110 may be a distributed system (e.g., cloud environment) having scalable/elastic computing resources 112 and/or storage resources 114. The user device 200 and/or the remote system 110 may execute a search system 300 and optionally receive data from one or more data sources 130. In some implementations, the search system 300 communicates with one or more user devices 200 and the data source(s) 130 via the network 120. The network 120 may include various types of networks, such as a local area network (LAN), wide area network (WAN), and/or the Internet.

Figure 1B:
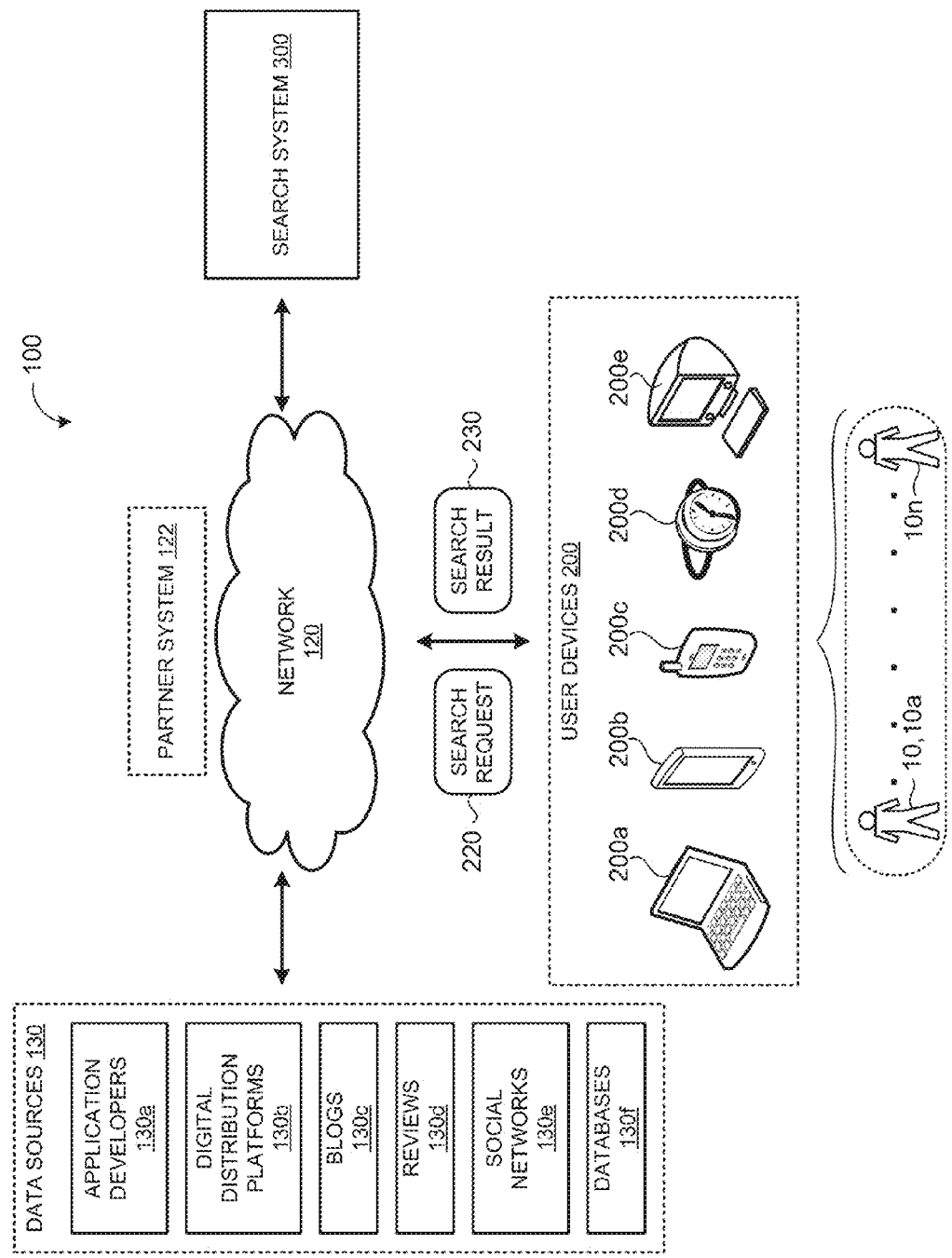
FIG. 1B is a schematic view of an example environment including a user device in communication with a search system and data sources.

Referring to FIG. 1B, in some implementations, user devices 200 communicate with the search system 300 via the network 120 or a partner computing system 122. The partner computing system 122 may be a computing system of a third party that may leverage the search functionality of the search system 300. The partner computing system 122 may belong to a company or organization other than that which operates the search system 300. Example third parties which may leverage the functionality of the search system 300 may include, but are not limited to, internet search providers and wireless communications service providers. The user devices 200 may send search requests 220 to the search system 300 and receive search results 230 via the partner computing system. The partner computing system may provide a user interface to the user devices 200 in some examples and/or modify the search experience provided on the user devices 200.

The search system 300 may use (e.g., query) the data sources 130 when generating search results 230. Data retrieved from the data sources 130 can include any type of data related to assessing a current state of the user 10. Moreover, the data retrieved from the data sources 130 may be used to create and/or update one or more databases, indices, tables (e.g., an access table), files, or other data structures of the search system 300.

The data sources 130 may include a variety of different data providers. The data sources 130 may include application developers 130a, such as application developers' websites and data feeds provided by developers and operators of digital distribution platforms 130b configured to distribute content to user devices 200. Example digital distribution platforms 130b include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 130 may also include websites, such as websites that include web logs 130c (i.e., blogs), review websites 130d, or other websites including data related to assessing a state of the user 10. Additionally, the data sources 130 may include social networking sites 130e, such as "FACEBOOK®" by Facebook, Inc. (e.g., Facebook posts) and "TWITTER®" by Twitter Inc. (e.g., text from tweets). Data sources 130 may also include online databases 130f that include, but are not limited to, data related to movies, television programs, music, and restaurants. Data sources 130 may also include additional types of data sources in addition to the data sources described above. Different data sources 130 may have their own content and update rate.

Figure 2A:
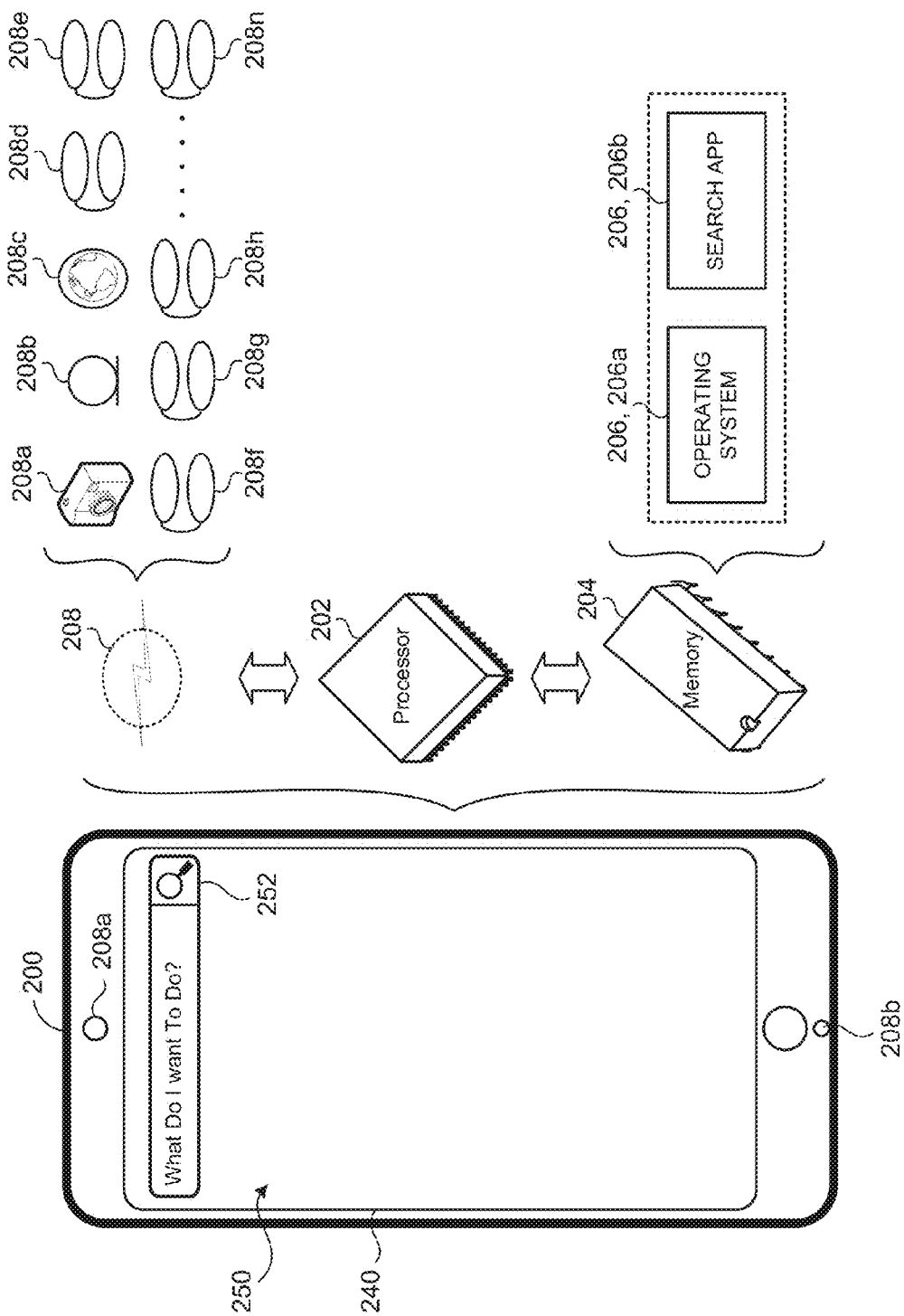
FIG. 2A is a schematic view of an example user device having one or more sensors.

FIG. 2A illustrates an example user device 200 including a computing device 202 (e.g., a computer processor) and non-transitory memory 204 in communication with the computing device 202. The memory 204 may store instructions for one or more software applications 206 that can be executed on the computing device 202. A software application 206 may refer to computer software that, when executed by the computing device 202, causes the computing device 202 to perform a task or operation. In some examples, a software application 206 may be referred to as an "application", an "app", or a "program". When the computing device 202 executes a software application 206, the software application 206 may cause the computing device 202 to control the user device 200 to effectuate functionality of the software application 206. Therefore, the software application 206 transforms the user device 200 into a special purpose device that carries out functionality instructed by the software application 206, functionality not otherwise available to a user 10 without the software application 206. Example software applications 206 include, but are not limited to, an operating system 206a, a search application 206b, word processing applications, spreadsheet applications, messaging applications, media streaming applications, social networking applications, and games. Applications 206 can be executed on a variety of different user devices 200. In some examples, applications 206 are installed on a user device 200 prior to a user 10 purchasing the user device 200. In other examples, the user 10 downloads and installs applications 206 on the user device 200.

User devices 200 can be any computing devices capable of communicating with the search system 300. User devices 200 include, but are not limited to, mobile computing devices, such as laptops, tablets, smart phones, and wearable computing devices (e.g., headsets and/or watches). User devices 200 may also include other computing devices having other form factors, such as desktop computers, vehicles, gaming devices, televisions, or other appliances (e.g., networked home automation devices and home appliances).

The user device 200 may use any of a variety of different operating systems 206a. In examples where a user device 200 is a mobile device, the user device 200 may run an operating system including, but not limited to, ANDROID® developed by Google Inc., IOS® developed by Apple Inc., or WINDOWS PHONE® developed by Microsoft Corporation. Accordingly, the operating system 206a running on the user device 200 may include, but is not limited to, one of ANDROID®, IOS®, or WINDOWS PHONE®. In an example where a user device is a laptop or desktop computing device, the user device may run an operating system including, but not limited to, MICROSOFT WINDOWS® by Microsoft Corporation, MAC OS® by Apple, Inc., or Linux. User devices 200 may also access the search system 300 while running operating systems 206a other than those operating systems 206a described above, whether presently available or developed in the future.

In some implementations, the user device 200 includes one or more sensors 208 in communication with the computing device 202 and capable of measuring a quality, such as a biometric quality, of the user 10. The sensor(s) 208 may be part of the user device 200 (e.g., integrally attached) and/or external from (e.g., separate and remote from, but in communication with) the user device 200. Sensors 208 separate and remote from the user device may communicate with the user device 200 through the network 120, wireless communication, such as Bluetooth or Wi-Fi, wired communication, or some other form of communication. The computing device 202 receives biometric data 212 (e.g., sensor signals or bioinformatics) and/or environmental data 214 (e.g., sensor signals, data structures, data objects, etc.) from one or more sensors 208. Examples of biometric data 212 may include, but are not limited to, a temperature of the user 10, an image (e.g., 2D image, 3D image, infrared image, etc.) of the user 10, a fingerprint of the user 10, a sound of the user 10, a blood oxygen concentration of the user 10, a blood glucose level of the user 10, a skin PH of the user 10, a blood alcohol level of the user 10, an activity level of the user 10 (e.g., walking step count or other movement indicator), a wake-up time of the user 10, a sleep time of the user 10, eating times, eating duration, eating type (e.g., meal vs. snack), etc. Examples of environmental data 214 may include, but are not limited to, a geolocation of the user device 200, a temperature, humidity, and/or barometric pressure about the user device 200, a weather forecast for a location of the user device 200, an image (e.g., 2D image, 3D image, infrared image, etc.) of a surrounding of the user device 200, a sound about the user 10, etc.

Example sensors 208 that may be included with the user device 200 include, but are not limited to, a camera 208a (e.g., digital camera, video recorder, infrared imaging sensor, 3D volumetric point cloud imaging sensor, stereo imaging sensor, etc.), a microphone 208b, a geolocation device 208c, an inertial measurement unit (IMU) 208d (e.g., 3-axis accelerometer), a fingerprint reader 208e, a blood oxygen meter 208f, a PH meter 208g, etc. The camera 208a may capture image data indicative of an appearance of the user 10 and/or an environment or scene about the user 10. The microphone 208b may sense audio of the user 10 and/or an environment or scene about the user 10. Example sensors 208 that may be separate from the user device 200 include a camera 208a, a temperature sensor 208h, a humidistat 208i, a barometer 208j, or any sensing device 208n capable of delivering a signal to the user device 200 that is indicative of the user 10, a surrounding of the user 10, or something that can affect the user 10.

If the user device 200 does not include a geolocation device 208c, the user device 200 may provide location data as an input 210 in the form of an internet protocol (IP) address, which the search system 300 may use to determine a location of the user device 200. Any of the sensors 208 described as being included in the user device 200 may be separate from the user device 200, and any of the sensors 208 described as being separate from the user device 200 may be included with the user device 200.

Figure 2B:
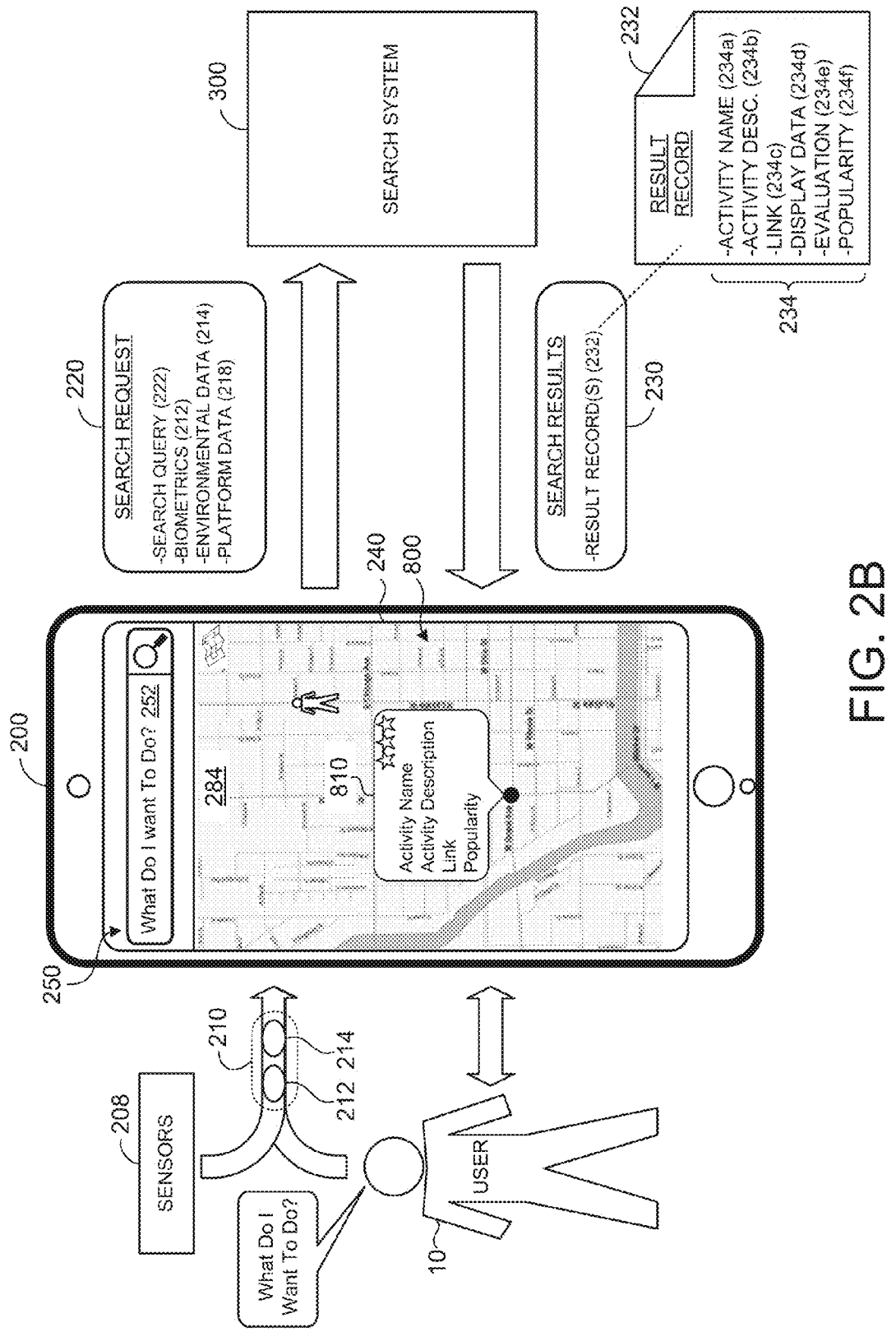
FIG. 2B is a schematic view of an example user device in communication with a search system.

FIG. 2B illustrates an example user device 200 in communication with the search system 300. In general, the user device 200 may communicate with the search system 300 using any software application 206 that can transmit a search request 220 to the search system 300 and receive search results 230 therefrom for display on a display 240 (e.g., screen or touch screen) in communication with the computing device 202 of the user device 200. In some examples, the user device 200 runs a native application 206 dedicated to interfacing with the search system 300; while in other examples, the user device 200 communicates with the search system 300 using a more general application 206, such as a web-browser application 206 accessed using a web browser.

In some implementations, the search application 206b receives one or more inputs 210, such as biometric data 212 or environmental data 214 from the sensor(s) 208 and/or the user 10 via a graphical user interface (GUI) 250 and transmits a search request 220 based on the received inputs 210 to the search system 300. The search application 206b may also receive platform data 218 form the user device 200 (e.g., version of the operating system 206a, device type, and web-browser version), an identity of the user 10 of the user device 200 (e.g., a username), partner specific data, and/or other data and include that information in the search request 220 as well. The search application 206b receives a search result set 230 from the search system 300, in response to submitting the search request 220, and optionally displays one or more result records 232 of the search results set 230 on the display 240 of the user device 200. In some implementations, the search request 220 includes a search query 222 containing a user specified selection (e.g., a category, genre, or string). The search application 206b may display a graphical user interface (GUI) 250 on the display 240 that may provide a structured environment to receive inputs 210 and display the search results 230, 232. In some implementations, the search application 206b is a client-side application and the search system 300 executes on the remote system 110 as a server-side system.

Figure 3:
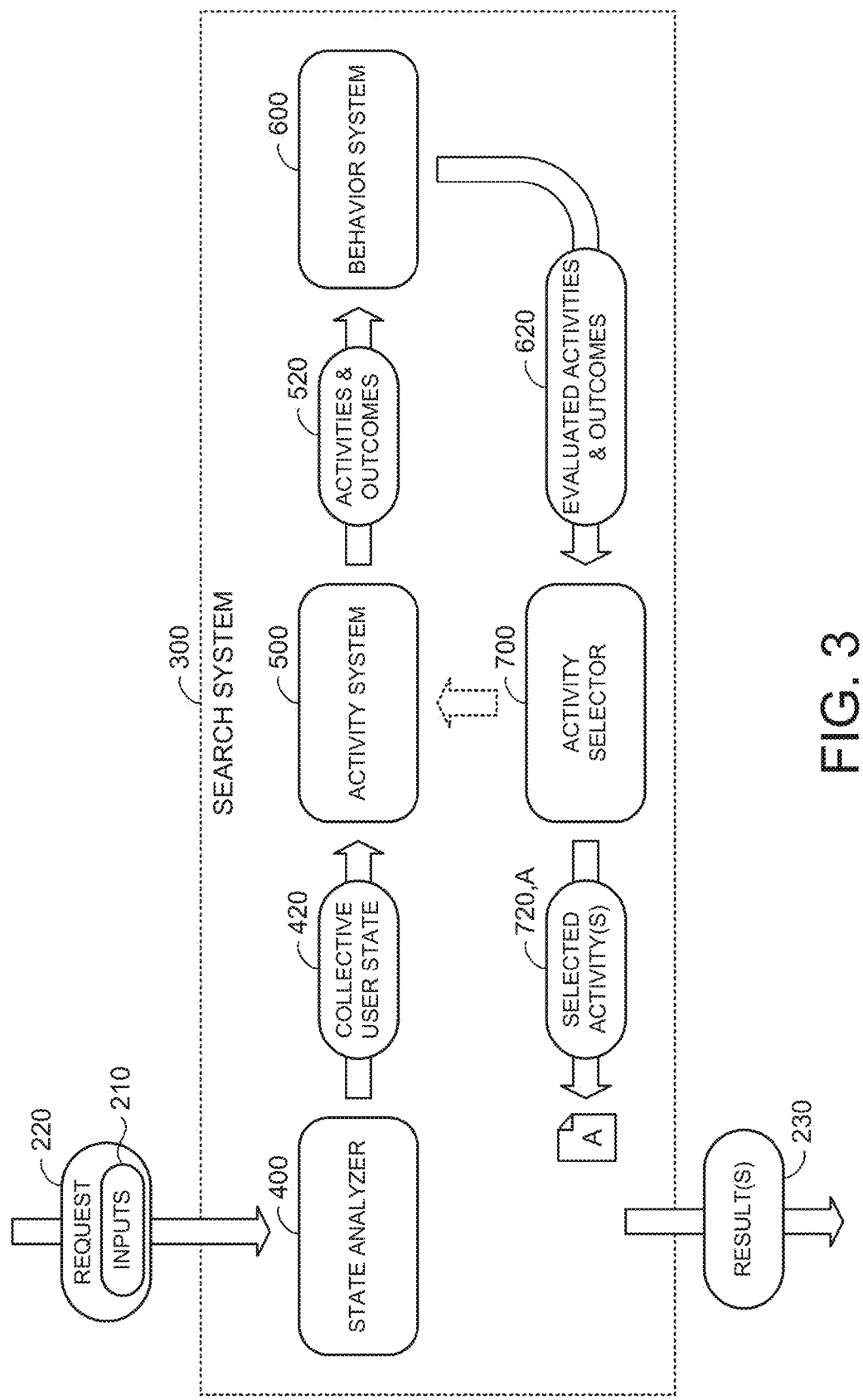
FIG. 3 is a schematic view of an example search system.

FIG. 3 illustrates a function block diagram of the search system 300. The search system 300 includes a state analyzer 400 in communication with an activity system 500, which is in communication with a behavior system 600. The behavior system 600 is in communication with an activity selector 700. Each sub-system 400, 500, 600, 700 of the search system 300 can be in communication with each other. The state analyzer 400 receives one or more inputs 210 (also referred to as user state indicators) that are indicative of a state of the user 10 and determines a collective state 420 of the user 10 (referred to as the collective user state 420). The activity system 500 receives the inputs/user state indicators 210 and/or the collective user state 420 from the state analyzer 400 and determines a collection 520 of possible activities A, $A_1$-$A_n$ and corresponding outcomes O, $O_1$-$O_n$ for the user 10 (referred to as an activity-outcome set 520). In some examples, the activity system 500 receives the inputs 210 directly from the user device 200. Moreover, the activity system 500 may receive the inputs 210 from the user device 200 instead of the collective user state 420 from the state analyzer 400 or just the collective user state 420 from the state analyzer 400 and not the inputs 210 from the user device 200. The behavior system 600 receives the activity-outcome set 520 from the state analyzer 400, evaluates each activity A based on its corresponding predicted outcome O, and provides a collection 620 of evaluated activities A, $A_1$-$A_n$ and optionally corresponding outcomes O, $O_1$-$O_n$ (referred to as an evaluated activity-outcome set 620). The activity selector 700 receives the evaluated activity-outcome set 620 from the behavior system 600 and determines a collection 720 of one or more selected activities A, $A_1$-$A_j$ (referred to as a selected activity set 720).

Referring to FIG. 4A, in some implementations, the state analyzer 400 receives one or more inputs/indicators 210 of the state of the user 10 (e.g., physical and/or emotional state) and determines the collective user state 420 of the user 10. The state analyzer 400 may combine the received user state indicators 210 to generate the collective user state 420. In additional implementations, the state analyzer 400 executes an algorithm on the received user state indicators 210 to generate the collective user state 420. The algorithm may logically group user state indicators 210 and select one or more groups of user state indicators 210 to generate the collective user state 420. Moreover, the state analyzer 400 may exclude user state indicators 210 logically opposed to other, more dominant user state indicators 210. For example, the state analyzer 400 may form a group of user state indicators 210 indicative of an emotional state of happiness and another on a state of hunger. For example, if the state analyzer 400 receives several user state indicators 210 (e.g., a majority) indicative of happiness and only a few or one (e.g., a minority) user state indicator 210 indicative of sadness, the state analyzer 400 may form a group of user state indicators 210 indicative of an emotional state of happiness, while excluding the minority user state indicators 210 indicative of an emotional state of sadness (since they're diametrically opposed).

In some implementations, the state analyzer 400 models the user 10 using the received user state indicator(s) 210 to generate the collective user state 420. Each received user state indicator 210 provides an aspect of the modeled user 10 as the collective user state 420. The state analyzer 400 may store the collective user state 420 in memory, such as the storage resources 114 of the remote system 110. In some examples, the state analyzer 400 generates and/or stores the collective user state 420 as an object, such as a Java script object notation (JSON) object, a metadata data object, structured data, or unstructured data. Other methods of storing the collective user state 420 are possible as well.

The input/user state indicator 210 may include any information indicative of the user's state of being, in terms of a physical state of being and/or an emotional state of being. Optional examples of a physical state may include, but are not limited to, date and/or time stamp 210a (e.g., from the computing device 202 of the user device 200), a location 210b of the user 10, a user-identified state indicator 210c of a physical well-being of the user 10, and a sensed indicator 210d of a physical well-being of the user 10 (e.g., biometrics). The location 210b of the user 10 may be a geolocation (e.g., latitude and longitude coordinates) of the user device 200, a description of the physical location of the user 10 in terms of landmarks and/or environmental descriptions, a description of a dwelling or building, a floor of the dwelling or building, a room of the dwelling or building, an altitude, etc. Examples of emotional states include, but are not limited to, user-identified state indicator 210c of an emotional state of the user 10 and sensed indicator 210d of a physical well-being of the user 10 (e.g., biometrics).

In some examples, the state analyzer 400 receives image inputs 210 of the user 10 from the camera 208a and determines an emotional state of the user 10 based on the images 210 (and optionally other inputs 210). The state analyzer 400 can gauge whether the user 10 is angry, happy, sad, surprised, eating, moving, etc. based on the image inputs 210. The image inputs 210 may be considered as user-identified state indicators 210c and/or sensed indicators 210d.

The user device 200 may receive the user-identified state indicator 210c from the user 10 through the GUI 250. The user-identified state indicator 210c may include one or more selections of images and/or description) indicative of different states of physical or emotional well-being or states of the user 10. In some examples, the user 10 can select one or more user-identified state indicators 210c on the GUI 250 that correspond to a combination of different user state indicators 210. The search application 206b may execute logic that disallows inconsistent selections. For example, the search application 206b may not allow the user 10 to select user-identified state indicators 210c of happy and sad at the same time.

The user state indicator 210 may optionally include user state indicators 210 of friends (referred to as friend state indicator 210e) from the remote system 110 or a data source. The friend state indicator 210e may be from any person having an identified association with the user 10. The user 10 may designate the associations of other people with their account and/or the state analyzer 400 may identify and designate other people as having an association with the user 10 based on the user state indicator 210 of other users 10 and/or authorized searching of email account(s), social networking account(s), or other online resources of the user 10.

The user state indicator 210 may optionally include a partner metric 210f (e.g., available funds from a banking institution) received from the user device 200 (e.g., as a user input) and/or from a remote data source 130 (e.g., a linked back account). The partner entities may be data sources 130 that provide information relative the user's state. For example, a mobile payment plan can provide mobile payment information, such as a purchase time, purchase location, store entity, goods purchased, purchase amount, and/or other information, which the search system 300 can use to determine the user collective state 420. Moreover, the activity system 500 may use partner metrics 210f to suggest activities A and predict outcomes O, the behavior system 600 may use partner metrics 210f to evaluate the activities A and predict outcomes O, and the activity selector 700 may use partner metrics 210f to select one or more activities A.

Similarly, the user state indicator 210 may optionally include a user schedule 210g received from the user device 200 (e.g., as a user input) and/or from a remote data source 130 (e.g., a linked scheduler or partner system 122). The schedule may be related to an eating, exercise, work, to-do list, etc.

Figure 4C:
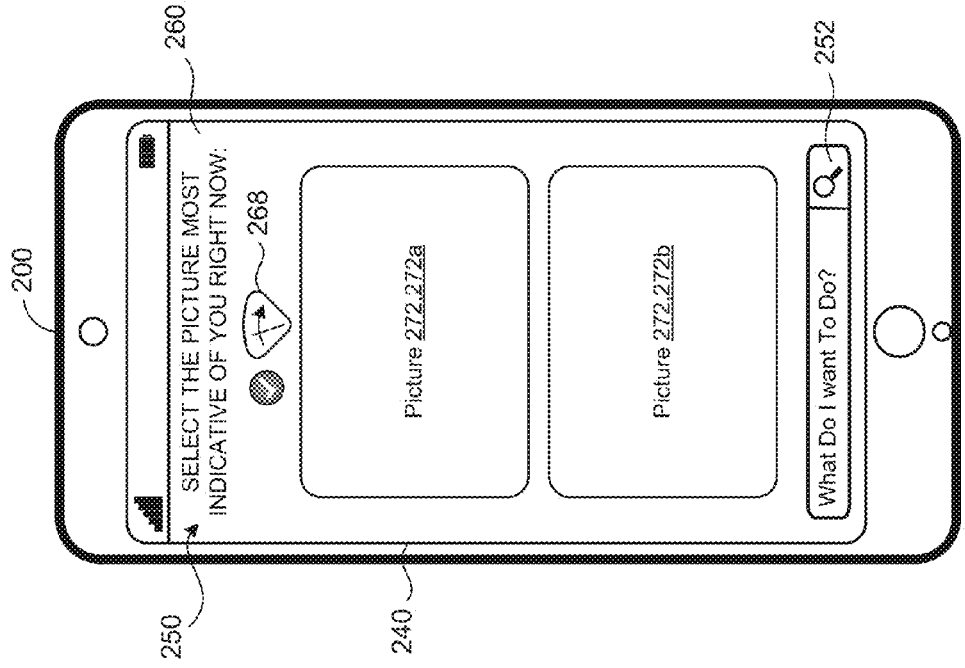
FIG. 4C is a schematic view of an example user device displaying an example state acquisition view having two images and allowing the user to select one of the images.
Figure 4B:
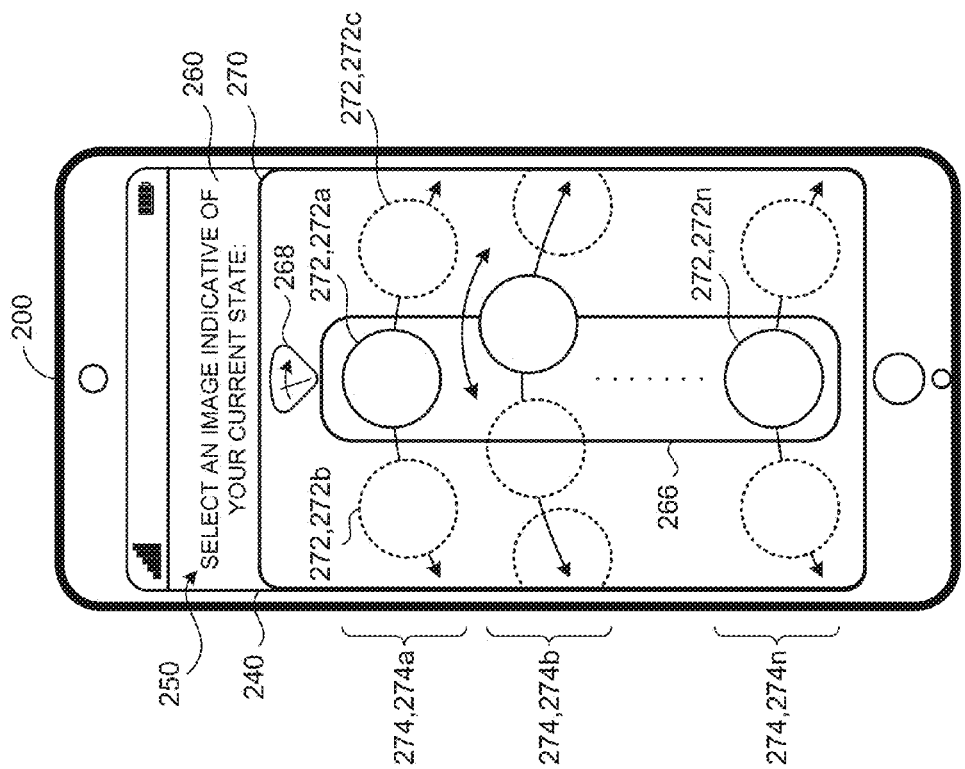
FIG. 4B is a schematic view of an example user device displaying an example state acquisition view having multiple images grouped by categories for selection by the user.

Referring to FIGS. 4B-4C, in some implementations, the search application 206b displays a state acquisition view 260 having a collection 270 of images 272, 272a-n (e.g., a tiling of pictures) in the GUI 250 and prompts the user 10 to select the image 272 most indicative of a current state of the user 10 (e.g., a user state indicator 210). The images 272 may depict a variety of possible user states, such as happy or sad, hungry of full, energetic or lethargic, etc. The selected image 272 may be a user state indicator 210. Additionally or alternatively, the GUI 250 may display one or more images 272, 272a-n and prompts the user 10 to tag the images 272, 272a-n with a corresponding user state. As the user 10 tags the images 272, 272a-n, the search system 300 learns the user's preferences.

In the example shown in FIG. 4B, the search application 206b may group the images 272 (e.g., by a category) into one or more groups 274, 274a-n and display the one or more groups 274, 274a-n in the GUI 250. The user 10 may scroll through the images 272 in each group 274 and select an image 272 most indicative of a current state of the user 10. For example, the search application 206b may display each group 274 of images 272 as a linear or curved progression (e.g., a dial), such that the user 10 can swipe across the screen 240 to move the linear progression or rotate the curve progression of images 272 onto and off the screen 240. The user 10 may scroll through each group 274, 274a-n of images 272, 272a-n and position a selected image 272 in a selection area 266 (e.g., selection box). The search application 206b may alter the selected image 272 or otherwise designate the selected image 272 as being selected. For example, the search application 206b may change the image 272 into another related image 272 or animate the image 272 (e.g., video). The search application 206b may highlight the selected image 272 or provide a visual or audio cue of the selection. In some examples, the search application 206b displays a gauge 268 indicating a level of discernment of the user's current state based on the number and/or type of images 272, 272a-n currently selected in the collection 270 of images 272, 272a-n. The search application 206b may indicate a threshold number of images 272, 272a-n that the user 10 should select before proceeding to obtain a suggested activity A.

In the example shown in FIG. 4C, the search application 206b may display a state acquisition view 260 having first and second images 272a, 272b in the GUI 250 and prompt the user 10 to select the image 272 most indicative of a current state of the user 10 (e.g., a user state indicator 210). When the user 10 selects one of the images 272a, 272b, the search application 206b may display two more images 272 in the GUI 250 and prompt the user 10 to select the image 272 most indicative of his/her current state, and continue recursively for a threshold period of time or until the user 10 selects a threshold number of images 272. The search application 206b may display a gauge 268 indicating a level of discernment of the user's current state based on the number and/or type of images 272, 272a-n selected. Moreover, the search application 206b may, in some instances, not allow the user 10 to proceed to receive a suggested activity A until the search application 206b and/or the search system 300 has ascertained a threshold level of discernment of the user's current state based on the number and/or type of images 272, 272a-n selected. For example, the search application 206b may display a first image 272a showing a person eating to illustrate a hungry state and a second image 272b showing a person full with a finished dinner plate to illustrate a full or not hungry state. In other examples, the search application 206b may display a first image 272a showing a person running to illustrate an inkling to go running and a second image 272b showing a person sitting or resting to illustrate an inkling to sit and rest. The user 10 may continue to select one of two images 272 until the gauge 268 indicates a threshold level of discernment of the user's current state or until the user 10 selects a query element 252 displayed in the GUI 250, at which point the search application 206b sends the query request 220 to the search system 300 to receive search result(s) 230 for display in the GUI 250.

Referring to FIG. 4D, in some implementations, the search application 206b displays a state acquisition view 260 having one or more menus 280 (e.g., categories of user state indicators 210). Each menu 280 may have one or more sub-menus 282 that further group or categories user state indicators 210. The user 10 may swipe across the screen 240 of the user device 200 in a non-linear path 286 (e.g., step like fashion) to navigation the menus 282, 284 to select a user state indicator 210 most indicative of the user's current state. The user 10 may continue to navigate the menus 282, 284 to select user state indicators 210 until the gauge 268 indicates a threshold level of discernment of the user's current state or until the user 10 selects the query element 252 displayed in the GUI 250, at which point the search application 206b sends the query request 220 to the search system 300 to receive search result(s) 230 for display in the GUI 250.

Referring to FIG. 4E, in some implementations, the search application 206b displays a preferences view 290 that allows the user 10 to set and modify user preferences P, $P_1$-$P_n$. The search system 300 may use the user preferences $P_1$-$P_n$ for generating search results 230. For example, the activity system 500 may use the user preferences $P_1$-$P_n$ for identifying possible activities A. Moreover, the behavior system 600 may use the user preferences $P_1$-$P_n$ for evaluating the possible activities A (and optionally any corresponding predicted outcomes O). When the user 10 selects a preference $P_1$-$P_n$, the search application 206b may display an edit preference view 292 that allows the user 10 to modify the selected preference $P_1$-$P_n$. In the example shown, when the user 10 selects a second preference $P_2$, corresponding to a sports preference, the search application 206b may display an edit preference view 292 customized to allow the user 10 to modify the selected preference $P_1$-$P_n$. Example preferences may include, but are not limited to, preferred eating times, eating duration, dining preferences (e.g., food types, restaurants, restaurant types, eating locations), leisure activities, cinema preferences, theaters, theater show types, to-do lists, sports activities, shopping preferences (e.g., stores, clothing types, price ranges), allowable purchase ranges for different types of goods or services, disposable income, personality type, etc. In some implementations, the user 10 may select an auto-populate preferences icon 294 to cause the search application 206b and/or the search system 300 to populate the preferences $P_1$-$P_n$ based on previous inputs 210 and/or selected activities A of the user 10 (e.g., stored in non-transitory memory 114). After auto-populating the preferences $P_1$-$P_n$, the user 10 may further customize the preferences $P_1$-$P_n$ using the preferences view 290.

Figure 5A:
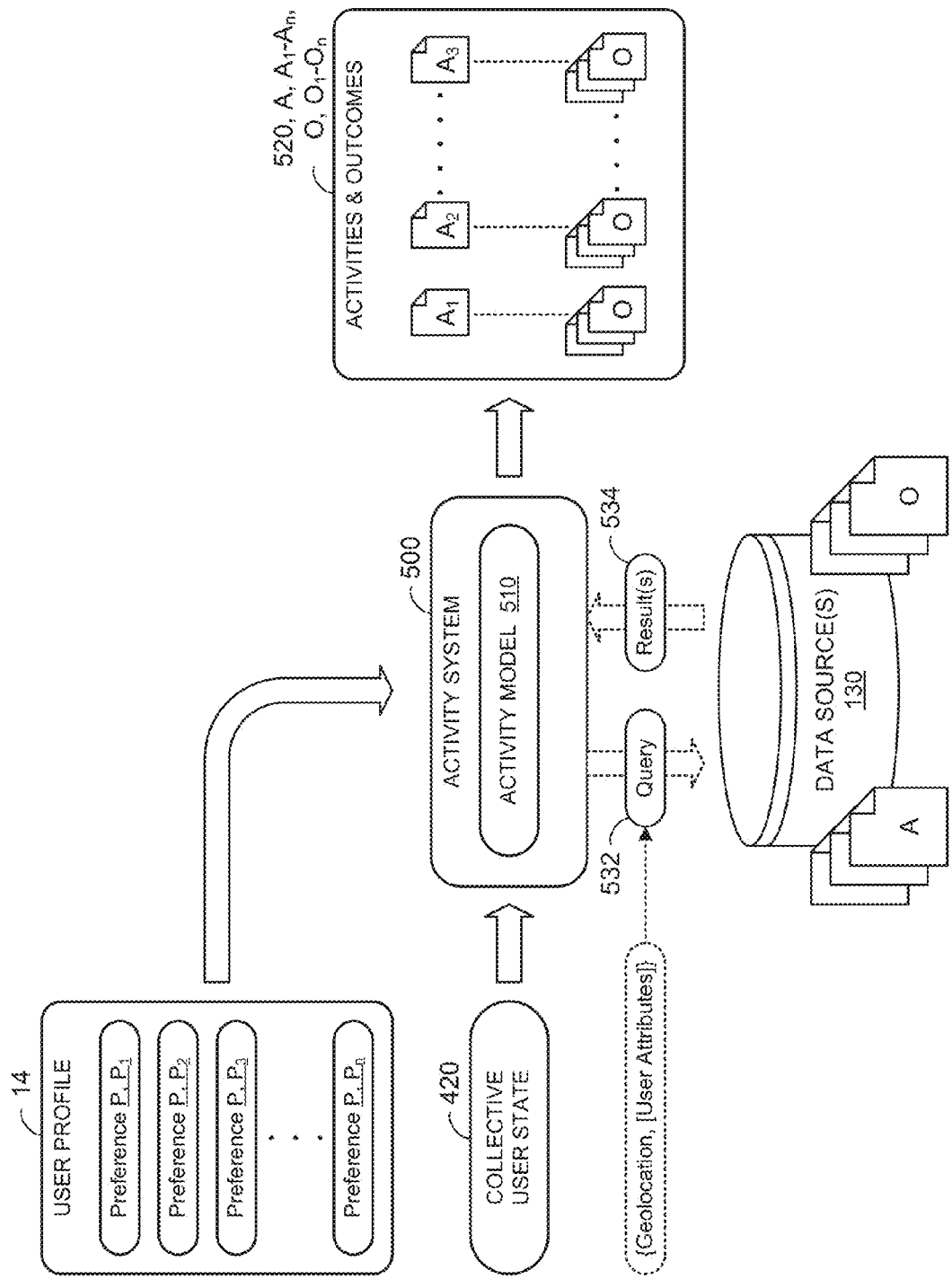
FIGS. 5A and 5B are schematic views of an example activity system that generates possible activities and optionally predicted outcomes of those activities.

Referring to FIG. 5A, in some implementations, the activity system 500 receives the collective user state 420 from the state analyzer 400, applies the collective user state 420 to an activity model 510 and determines the collection 520 of possible activities A, $A_1$-$A_n$ and corresponding outcomes O, $O_1$-$O_n$ for the user 10 (i.e., the activity-outcome set 520). The activity system 500 may use a user profile 14 of the user 10 to determine the activity-outcome set 520. A data source 130 (e.g., data store, non-transitory memory, a database, etc.) in communication with the activity system 500 may store the user profile 14, possible activities A, and/or possible outcomes O. For example, the activity system 500 may identify one or more preferences $P_1$-$P_n$ of the user 10 from the user profile 14 for use with the activity model 510 to determine the activity-outcome set 520. The activity system 500 may optionally query one or more data sources 130 or the storage resources 114 of the remote system 110 for data on possible activities A and/or corresponding outcomes O. In some examples, the activity system 500 simulates each activity A, using the activity model 510, over a time horizon in the future to predict a corresponding outcome O, optionally using results 534 queried from the data source(s) 130.

Figure 5B:
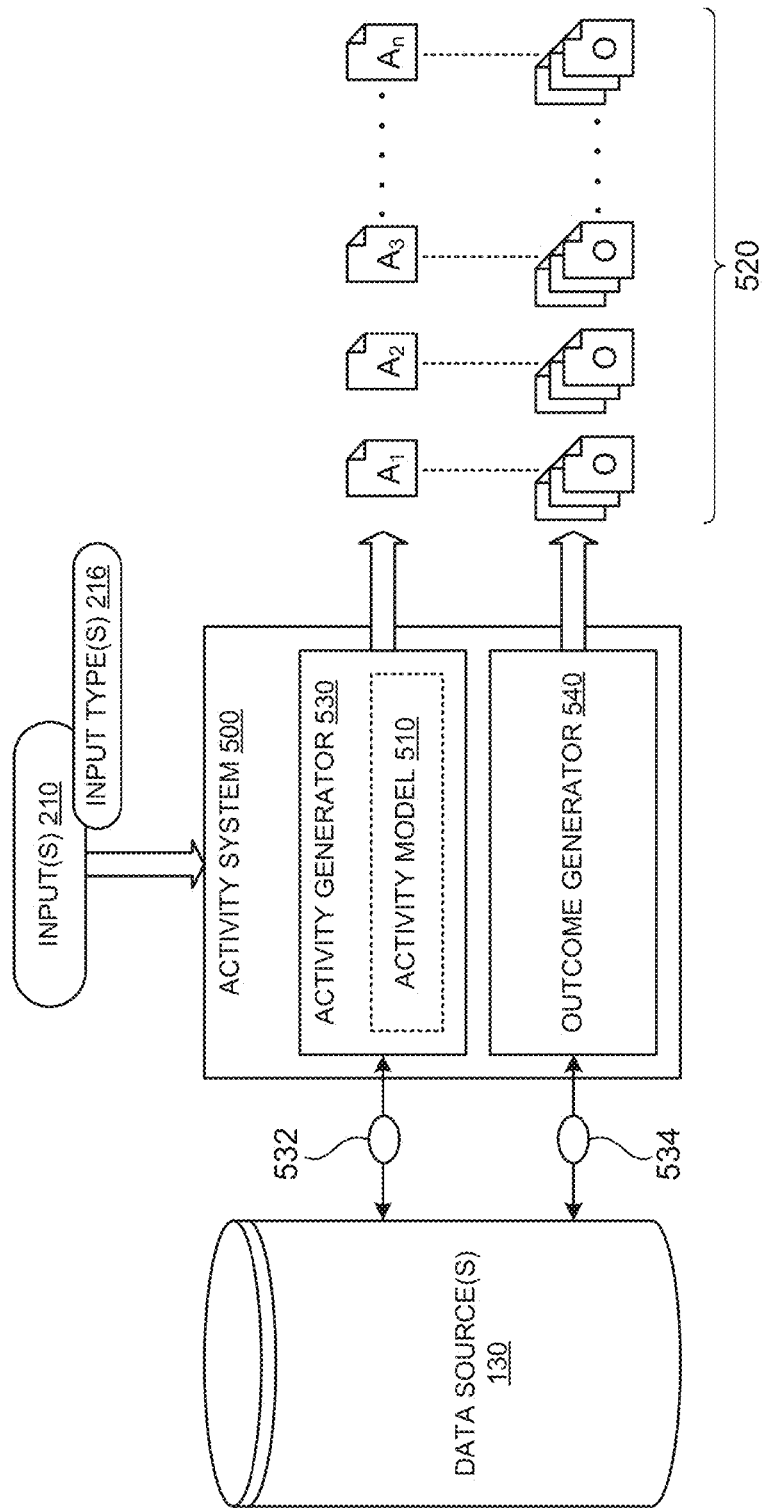

Referring also to FIG. 5B, in some implementations, the activity system 500 includes an activity generator 530 that generates possible activities A based on the received inputs 210 (and/or collective user state 420) and an outcome generator 540 that generators the set 520 of possible outcomes O for each activity A. The activity generator 530 may generate an activity search query 532 based on the inputs 210 and a type 216 of each input 210 and query the data source(s) 130 to obtain results 534, which the activity generator 530 can use to determine one or more possible activities A. For example, an input 210 may be a global positioning system (GPS) coordinate having an input type 216 of location. The input type 216 may be strongly typed to accept coordinate values as the corresponding input 210. An activity search query 532 may include criteria to seek possible activities A within a threshold distance of the location. Moreover, the threshold distance may be based on the location.

In some implementations, the activity generator 530 seeks activities A relevant to active behaviors 610. The activity generator 530 may identify all or a sub-set of the active behaviors 610 and then seek activities A that each behavior 610 can evaluate positively. For example, if a sports behavior 610e is active, then the activity generator 530 may seek possible activities A related to sports.

After the activity generator 530 generates a collection of possible activities A, the outcome generator 540 generates a collection of one or more predicted outcomes O for each activity A. In some implementations, the outcome generator 540 retrieves possible outcomes O from a data store staring outcomes O for various activities A. For example, the outcome generator 540 may query the data source(s) 130 for possible outcomes O matching a criteria indicative of the activity A. The data source(s) 130 may include databases, partner systems 122, and other sources of information.

Figure 6A:
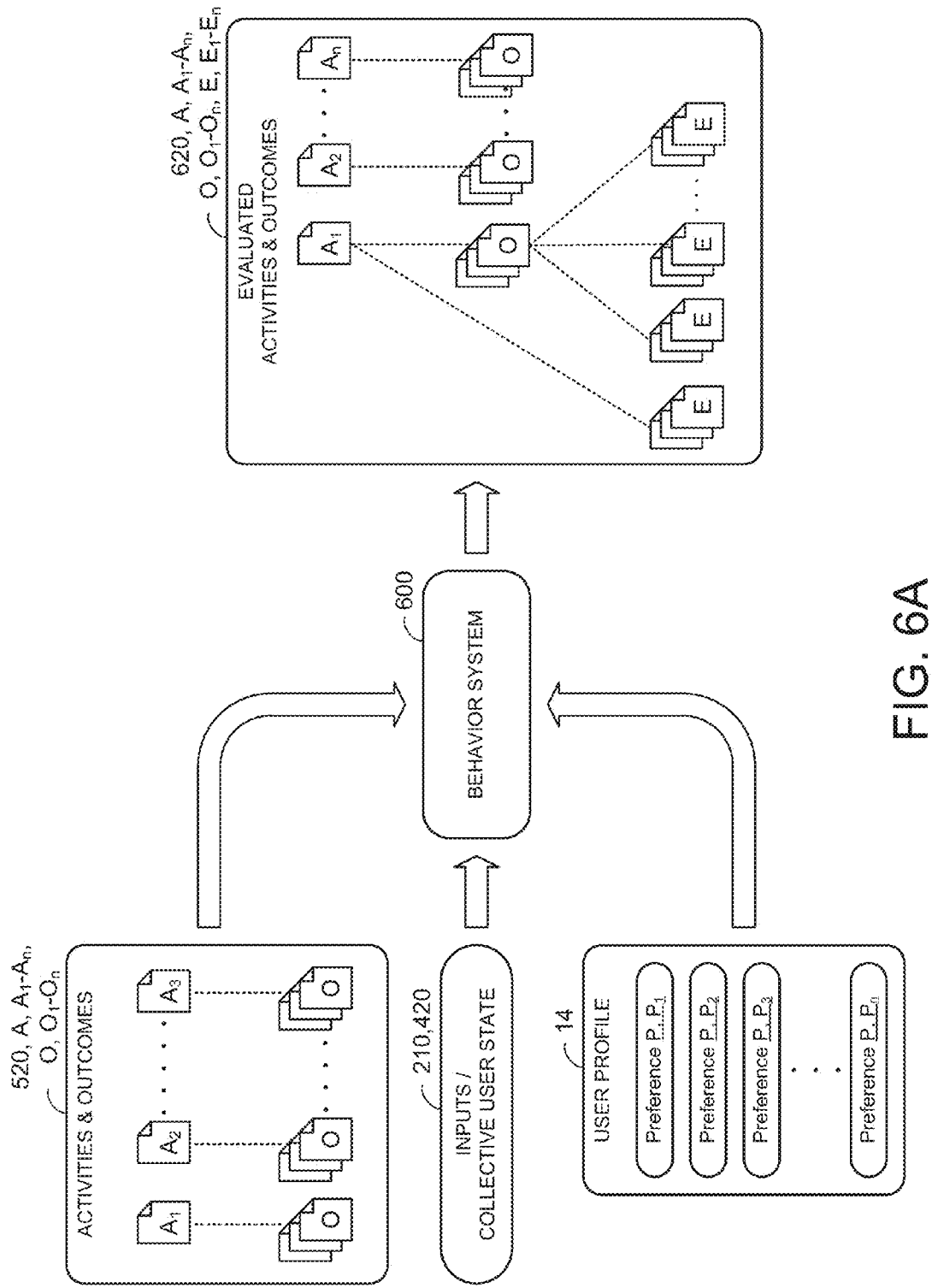
FIG. 6A is a schematic view of an example behavior system that evaluates activities and optionally predicted outcomes of those activities.
Figure 6B:
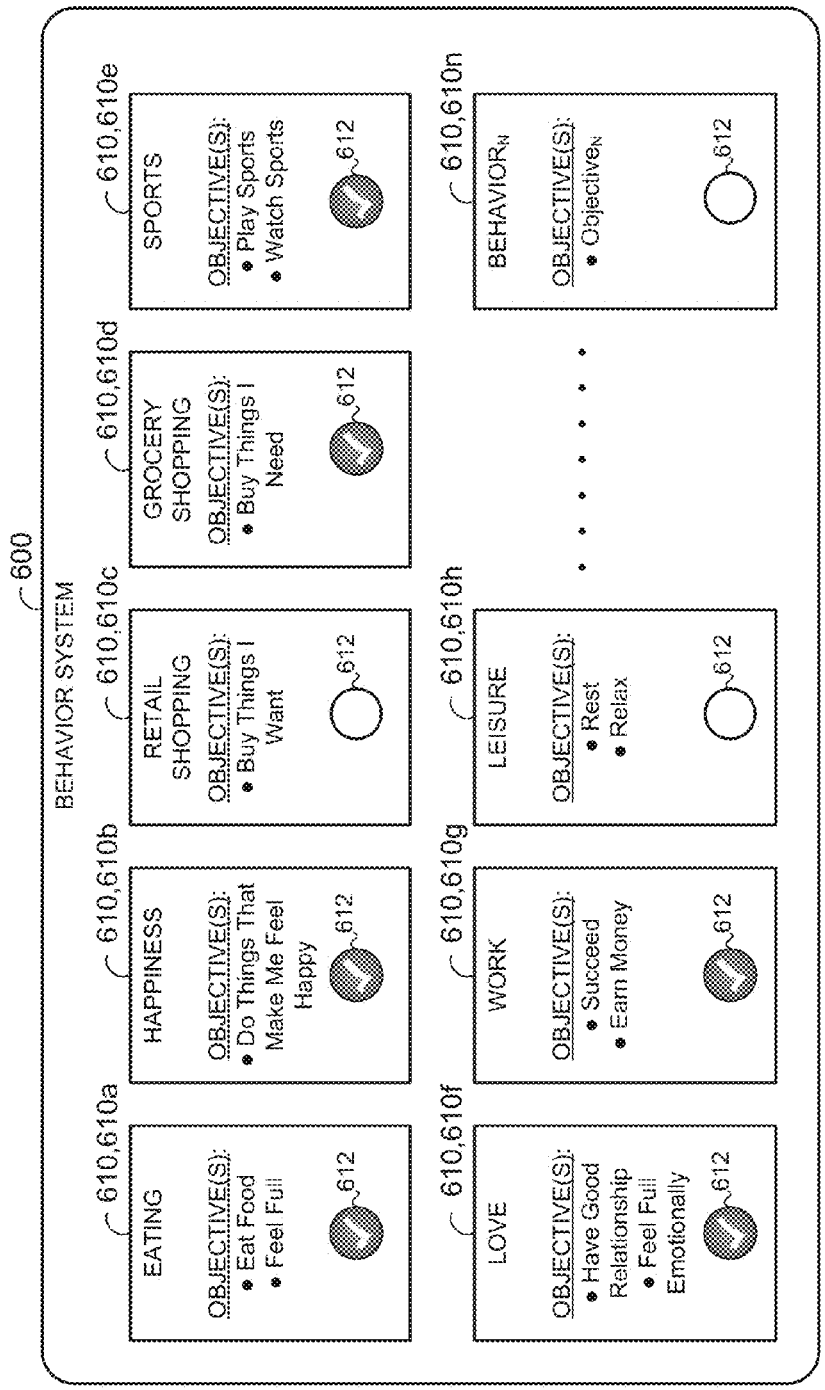
FIG. 6B is a schematic view of an example behavior system having several behaviors.
Figure 6C:
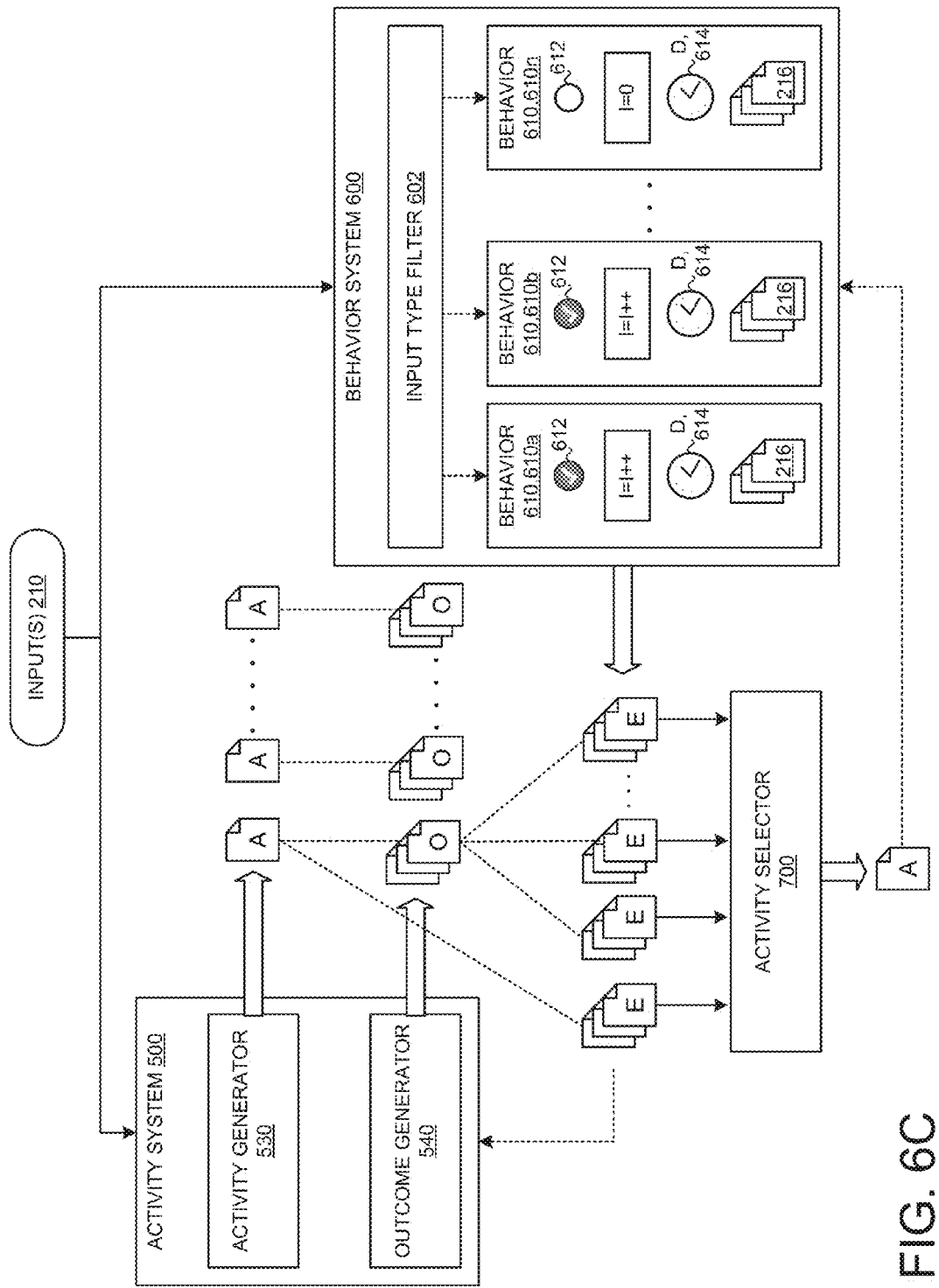
FIG. 6C is a schematic view of an example behavior system interacting with the activity system and an activity selector.

Referring to FIGS. 6A-6C, in some implementations, the behavior system 600 receives the activity-outcome set 520 from the activity system 500, evaluates each activity A based on its corresponding predicted outcome O, and provides the collection 620 of evaluated activities A and outcomes O (i.e., the evaluated activity-outcome set 620). The behavior system 600 includes behaviors 610 that provide predictive modeling of the user 10 and allows the behaviors 610 to collaboratively decide on the activities A by evaluating the activities A and/or the corresponding possible outcomes O of activities A. A behavior 610 may use the inputs 210, the collective user state 420, the preferences P. $P_1$-$P_n$ in the user profile 14 of the user 10, any additional sensory feedback of the user 10, and/or any relevant information from data sources 130 to evaluate each activity A and/or its predicted outcome(s) O, and therefore provide evaluation feedback on the allowable activities A of the user 10. The behaviors 610 may be pluggable into the behavior system 600 (e.g., residing inside or outside of a software application), such that they can be added and removed without having to modify the behavior system 600. Each behavior 610 is a standalone policy. To make behaviors 610 more powerful, it is possible to attach the output of one or more behaviors 610 together into the input of another behavior 610.

A behavior 610 may model a human behavior and/or a goal oriented task. Example behaviors 610 include, but are not limited to, an eating behavior 610a, a happiness behavior 610b (e.g., a pursuit of happiness), a retail shopping behavior 610c, a grocery shopping behavior 610d, a sports behavior 610e, a love behavior 610f, a work behavior 610g, a leisure behavior 610h, etc.

Behaviors 610 may model psychological decision making of humans. Moreover, the behaviors 610 may be configurable. In some examples, the user 10 may set a preference P to configure or bias one or more behaviors 610 to evaluate activities A and/or outcomes O toward that bias. In some examples, the user 10 can set a preference P to have the search system 300 aid the user 10 in making better choices (e.g., choices toward a healthier lifestyle). For example, the user 10 may set a preference P to bias one or more behaviors 610 to evaluate activities A and/or outcomes O that help the user 10 live a healthier lifestyle (e.g., in terms of diet, exercise, relationships, work, etc.).

A behavior 610 may have one or more objectives that it uses when evaluating activities A and/or outcomes O. The behavior 610 may execute a scoring algorithm or model that evaluates outcomes O against the one or more objectives. The behavior 610 may score outcomes O fulfilling the objective(s) higher than other outcomes O that do not fulfill the objective(s). Moreover, the outcome evaluation may be weighted. For example, an eating behavior 610a may evaluate an activity A based on whether the predicted outcome O will make the user 10 less hungry. Moreover, the outcome evaluation may be weighted based on a user state of hunger and on the likelihood of fulfilling the objective of making the user 10 less hungry. For example, the eating behavior 610a may evaluate a first activity $A_1$ of going to a restaurant to eat pizza more favorably than a second activity $A_2$ of going to the cinema, because a predicted first outcome $O_1$ of going to a restaurant to pizza will more likely have an outcome O of satisfying a user state of hunger than going to the cinema, even though a predicted second outcome $O_2$ for the second activity $A_2$ of going to the cinema may include eating popcorn.

A behavior 610 may optionally base its evaluations E on preferences P, $P_1$-$P_n$ in the user profile 14 of the user 10. For example, the eating behavior 610a may evaluate a third activity $A_3$ of going to LOU MALNATIS® (a registered trademark of Lou Malnatis, Inc.) to eat pizza more favorably than the first activity $A_1$ of going to PIZZA HUT® (a registered trademark of Pizza Hut, Inc.) to eat pizza, when a first preference $P_1$ in the user profile 14 indicates that LOU MALNATIS pizza is the user's favorite brand of pizza. Therefore, a behavior 610 may use the one or more objectives of that behavior 610 in combination with one or more preferences P, $P_1$-$P_n$ of the user profile 14 of the user 10 to evaluate activities A and/or outcomes O of those activities A.

The activity-outcome evaluation E of one behavior 610 may be used by another behavior 610 when evaluating the corresponding activity A and/or outcome O. For example, a happiness behavior 610b may evaluate the third activity $A_3$ of going to eat LOU MALNATIS pizza more favorably based the favorable evaluation of the eating behavior 610a and on the corresponding predicted outcome $O_3$ that eating pizza will make the user 10 more happy (e.g., versus sad). Moreover, the collective user state 420 may indicate that the user 10 is cold, based on sensor data 212 of a sensor 208, and the happiness behavior 610b may evaluate the third activity $A_3$ of going to eat LOU MALNATIS pizza even more favorably based on the predicted outcome O3 that eating pizza will make the user 10 warmer and therefore happier. Therefore, the behavior system 600 may execute many combinations of evaluations by behaviors 610 (some in parallel or some in series) based on prior evaluations, preferences P, etc.

Based on internal policy or external input (e.g., the collective user state 420 or other information), each behavior 610 may optionally decide whether or not it wants to participate in evaluating any activities A in the activity-outcome set 520. In some examples, if the collective user state 420 indicates that the user 10 is full (i.e., not hungry), the eating behavior 610a may opt out of evaluating the activities A and outcomes O. In other examples, if the collective user state 420 indicates that the user 10 is full (i.e., not hungry), the eating behavior 610a may evaluate activities A having predicted outcomes O of making the user 10 more full as undesirable (e.g., a poor evaluation or a low score).

Different inputs/user state indicators 210 can trigger different behaviors 610, 610a-n. A behavior 610 may persist for a duration of time. In some examples, a behavior 610 has a state 612 and exists in an active state or an inactive state. Certain types of inputs 210 may pertain to certain types of behaviors 610. One or more input types/user state indicator types 216 may be associated with each behavior 610. In other words, each behavior 610 may have an associated collection of input types 216 that the behavior 610 finds pertinent to its operation. For example, an input type 216 of hunger level for a user-defined input 210 of hunger having a scale (e.g. 1-10) indicating a level of hunger can be related to an eating behavior 610a. Another input type 216 that may be associated with the eating behavior 610a is proximity (which may be strongly typed as a distance in miles) for an input 210 of distance to a nearest restaurant. When the search system 300 (e.g., in particular, the behavior system 600) receives an input 210 of a type 216 associated with a behavior 610, the receipt of that input 210 may trigger activation of the behavior 610. The receipt of the input 210 may cause a behavior 610 to change state 612 from an inactive state to an active state.

In addition to becoming active, upon the receipt of one or more inputs 210 having a type 216 associated with the behavior 610, the number of those inputs 210, in some implementations, has a direct correlation to an influence I of the behavior 610. In other words, the greater the number of received inputs 210 having a type 216 associated with the behavior 610, the greater the influence I of that behavior 610. Evaluations of predicted outcomes O of a behavior 610 may be weighted based on the influence I of the behavior 610. For example, the evaluation E can be a number, which is multiplied by the influence I (e.g., a number). As a result, behaviors 610 with greater influence I have a relatively greater influence on the selection of an activity A.

In some implementations, the influence I is a count. Each time the behavior system 600 receives an input 210, the behavior system 600 increments a value of the influence I of each behavior 610 that has associated therewith the input type 216 of the received input 210. The behavior system 600 may include an input type filter 602 that receives the inputs 210 identifies which behaviors 610, if any, are associated with the input type 216 of the input 210 and increment the influence I of the affected behavior(s) 610.

In some implementations, each behavior 610 has an associated duration D. Receipt of an input 210 having a type 216 associated with the behavior 610 commences an input timer 614 set for a duration of time associated with the input 210 or the input type 216. When the input timer 614 expires, the behavior system 600 decrements the influence I of the behavior 610 (which was previously incremented for that input 210). Alternatively or additionally, the behavior system 600 may decrement the influence I of each behavior 610 every threshold period of time. When the influence I of a behavior 610 is zero, the behavior 610 changes state 612 from the active state to the inactive state. If the behavior system 600 receives an input 210 having an input type 216 associated with an inactive behavior 610, the behavior system 600 increments the influence I of that behavior 610, causing the behavior 610 to have an influence I greater than zero, which causes the behavior 610 to change state 612 from the inactive state to the active state. Once in the active state, the behavior 610 can participate in evaluating predicted outcomes O of activities A and/or the activities A themselves.

Behaviors 610 may evaluate activities A and/or predicted outcomes O of activities A. By evaluating both an activity A and the predicted outcomes O of the activity A, the behavior 610 offers a multi-pronged evaluation E. For example, while the behavior 610 may positively evaluate an activity A, it may negatively evaluate one or more of the predicted outcomes O of that activity A. As an illustrative example, if the behavior system 600 receives inputs 210 indicating that the user 10 is outdoors and on a street, then a sports behavior 610e may positively evaluate an activity A to ride a bicycle. If additional inputs 210 indicate that the user 10 is on a very busy street, then the sports behavior 610e may negatively evaluate a predicted outcome O of getting hit by a car.

In some implementations, a behavior 610 evaluates activities A and/or predicted outcomes O of activities A positively when the activity A has a type associated with the behavior 610, and negatively when the activity A has a type not associated with the behavior 610. The behavior system 600 may reference behavior-activity associations stored in non-transitory memory 130. The behavior-activity associations may have several nested layers (e.g., associations in a nested arrangement).

Figure 7:
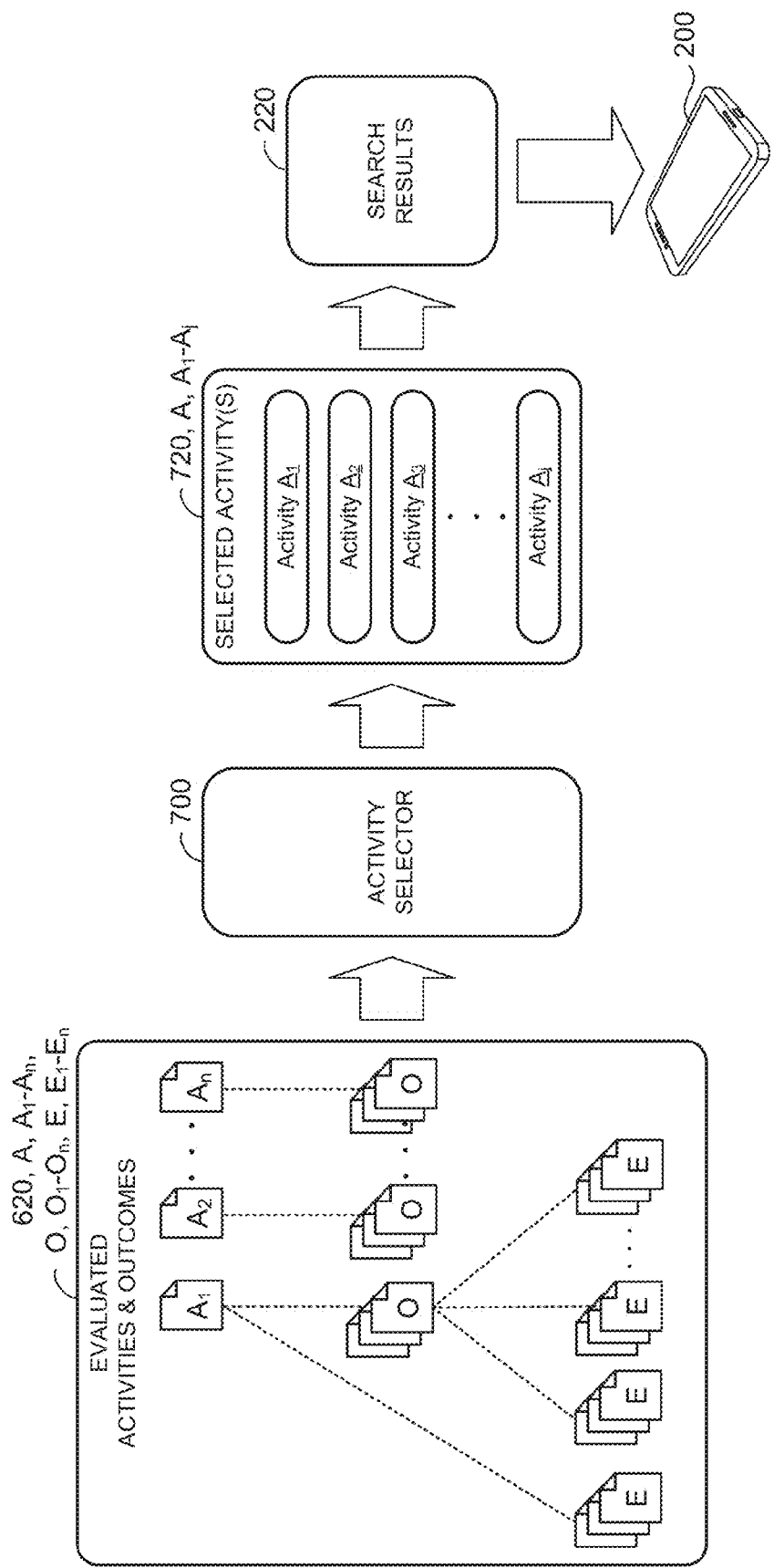
FIG. 7 is a schematic view of an example activity selector.

Referring to FIG. 7, in some implementations, the activity selector 700 receives the evaluated activity-outcome set 620 from the behavior system 600 and determines the collection 720 of one or more selected activities A, $A_1$-$A_j$ (i.e., the selected activity set 720). The activity selector 700 executes an activity selection routine that searches for the best activity(s) A, $A_1$-$A_j$ given the evaluations E, $E_1$-$E_n$ of their corresponding outcomes O, $O_1$-$O_n$ by all of the participating active behaviors 610, 610a-n. In some implementations, the activity selector 700 calculates one or more preferred outcomes O, $O_1$-$O_n$, based on the outcome evaluations E, $E_1$-$E_n$ of the behaviors 610 and selects one or more corresponding activities A, $A_1$-$A_j$ for the selected activity set 720. The activity selector 700 may optionally send the selected activity set 720 to the activities system 500 (e.g., to the activity model 510) as feedback.

In some implementations, the activity selector 700 assesses the evaluations E, $E_1$-$E_n$ of the possible outcomes O, $O_1$-$O_n$ of the activities A, $A_1$-$A_n$ and determines a combination of activities A, $A_1$-$A_j$ that provides a combined outcome O. The combined outcome O may achieve higher user stratification than any single individual outcome O. The activity selector 700 may select the combination of activities A, $A_1$-$A_j$ having the determined combined outcome O as the selected activity set 720. For example, if the inputs 210 indicate that the user 10 is hungry and likely seeking entertainment, a combined outcome O of both eating and watching a show may be very favorable. Therefore, a combined action may be going to a dinner-theater event that includes eating and watching a show.

Referring again also to FIG. 2B, the search system 300 sends search results 230 to the user device 200, in response to the search query 220. In some implementations, the search results 230 include one or more result records 232, which include information about or pertaining to the selected activity set 720. For example, the search results 230 may be a recordset that includes a result record 232 for each selected activity A. Moreover, the result record 232 may include a description 234 of the corresponding selected activity A (referred to as an activity description) that identifies the activity A and how to experience the activity A. In some examples, the activity description 234 includes an activity name 234a, an activity description 234b, a link 234c (e.g., a uniform resource locator (URL) or other type or resource locator for accessing a webpage, an application, etc.), display data 234d, and/or other data related to the activity A, such as an evaluation score 234e (e.g., by the activity selector 700), a popularity score 234f (e.g., retrieved from a data source 130). The activity description 234b may include a textual description of the activity A and/or location information (e.g., geolocation coordinates, a textual street location, etc.) for the activity A. In some examples, the activity description 234 may include information explaining why the search system 300 chose a particular activity A. For example, the activity description 234 may explain that the search system 300 chose an activity A related to eating, because a majority of the inputs 210 indicated that the user 10 was very hungry and close in proximity to a favorite restaurant (e.g., as indicated by a user preference P). In some implementations, the search application 206b, executing on the user device 200, generates a result view 800 based on the received search results 230 and displays the result view 800 in the GUI 250. The result view 800 includes one or more activity messages 810 corresponding to each result record 232 in the search results 230.

Figure 8A:
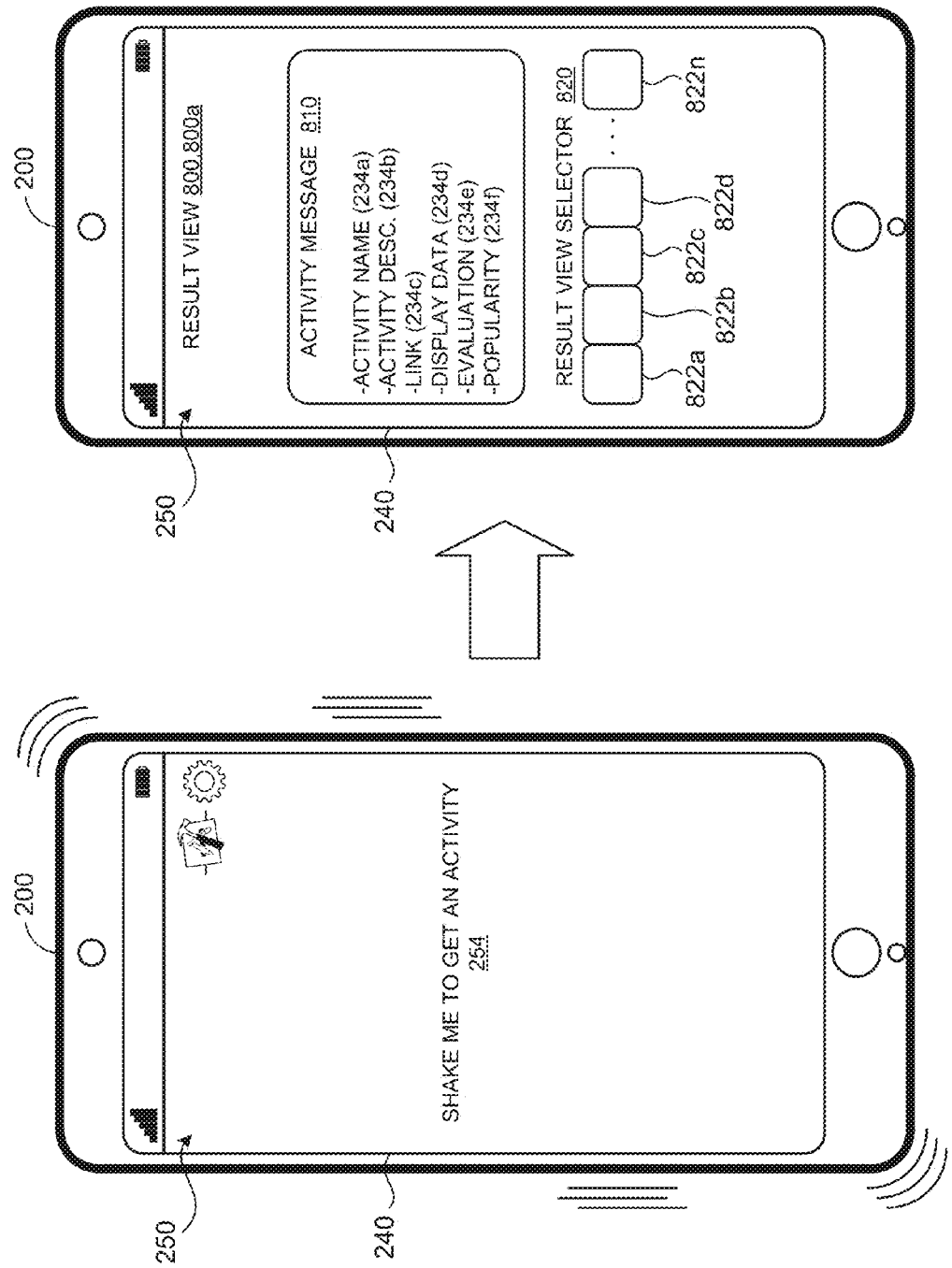
FIG. 8A is a schematic view of an example user device being shaken to initiate retrieval of a suggest activity for the user.

Referring to FIG. 8A, in some implementations, the search application 206b displays a message 254 in the GUI 250 prompting the user 10 to shake the user device 200 to receive a suggested activity A. When the user 10 shakes the user device 200, the search application 206b receives an input 210 from the IMU 208d of the user device 200 indicating that the user 10 is shaking the user device 200 back and forth. In response to the received input 210, the search application 206b may send the query request 220 to the search system 300 to receive search result(s) 230 for display in the GUI 250. The search application 206b may display a result view 800 in the GUI 250 that shows one or more activity messages 810.

In some implementations, the result view 800, 800a includes an activity message 810 that includes the activity name 234a, the activity description 234b, the link 234c, the evaluation score 234e, and/or the popularity score 234f from the corresponding result record 232. The result view 800 may also include a result view selector 820 having icons 822a-n corresponding to alternative result views 800, 800a-n. When the user selects one of the icons 822a-n, the search application 206b displays the corresponding result view 800a-n.

In response to selection of a link 234c, the user device 200 may launch a corresponding software application 206 (e.g., a native application or a web-browser application) referenced by the link 234c and perform one or more operations indicated in the link 234c and/or the display data 234d. For example, the link 234c may include a URL having query string containing data to be passed to the software application 206 or software running on a remote server 112 (e.g., the query string may contain name/value pairs separated by delimiters, such as ampersands). If the link 234c is configured to access a native application 206, the link 234c may include a string (e.g., a query string) that includes a reference to the native application 206 and indicates one or more operations for the user device 200 to perform. When the user 10 selects the link 234c for the native application 206, the user device 200 launches the native application 206 referenced in the link 234c and performs the one or more operations indicated in the link 234c. If the references application 206 is not installed on the user device 200, the link 234c may direct the user 10 to a location (e.g., a digital distribution platform 130b) where a native application 206 can be downloaded. If the link 234c is configured to access a web-based application 206, the link 234c may include a string (e.g., a query string) that includes a reference to a web resource (e.g., a page of a web application/website). For example, the link 234c may include a URL (i.e., a web address) used with hypertext transfer protocol (HTTP). When the user 10 selects the link 234c, the user device 200 launches a web browser application 206 and retrieves the web resource indicated in the resource identifier.

The search application 206b may display the search results 230 to the user 10 in a variety of different ways, depending on what information is transmitted to the user device 200. Moreover, the search application 206b may display the search results 230 in the GUI 250 based on the display data 234d. The display data 234d may include text, images, layout information, a display template, a style guide (e.g., style sheet), etc.

Figure 8B:
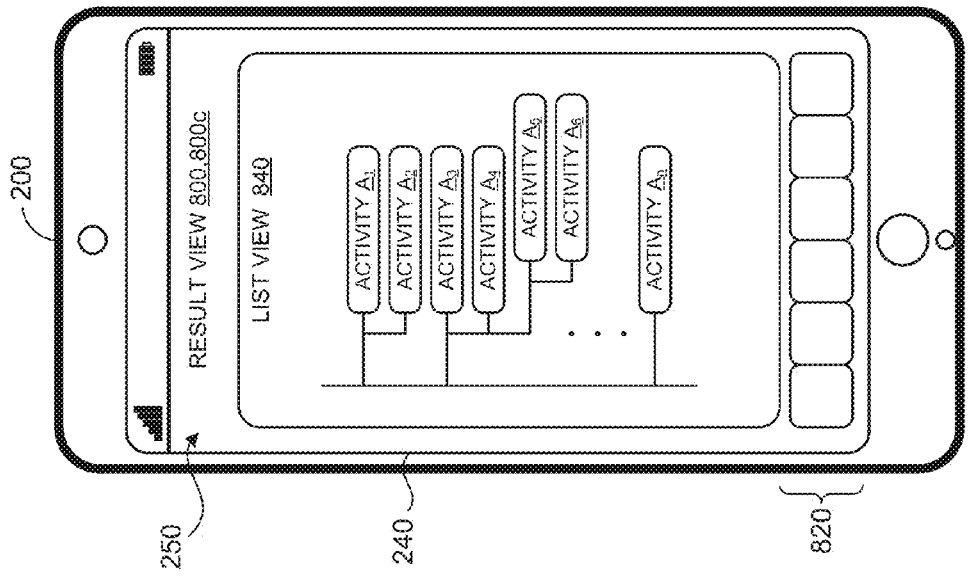
FIG. 8B is a schematic view of an example user device displaying an example result view having a map.

In the example shown in FIG. 8B, a result view 800, 800b may include a map 830 having a user icon 832 indicating a current location of the user device 200 on the map 830 and the one or more activity results 810 in their corresponding locations 834 on the map 830. The user 10 can view information from the corresponding result record 232 displayed in the activity result 810 (e.g., the activity name 234a, the activity description 234b, the link 234c, the evaluation score 234e, and/or the popularity score 234f). The link 234c may include a link display name as well as the underlying resource locator.

Figure 8C:
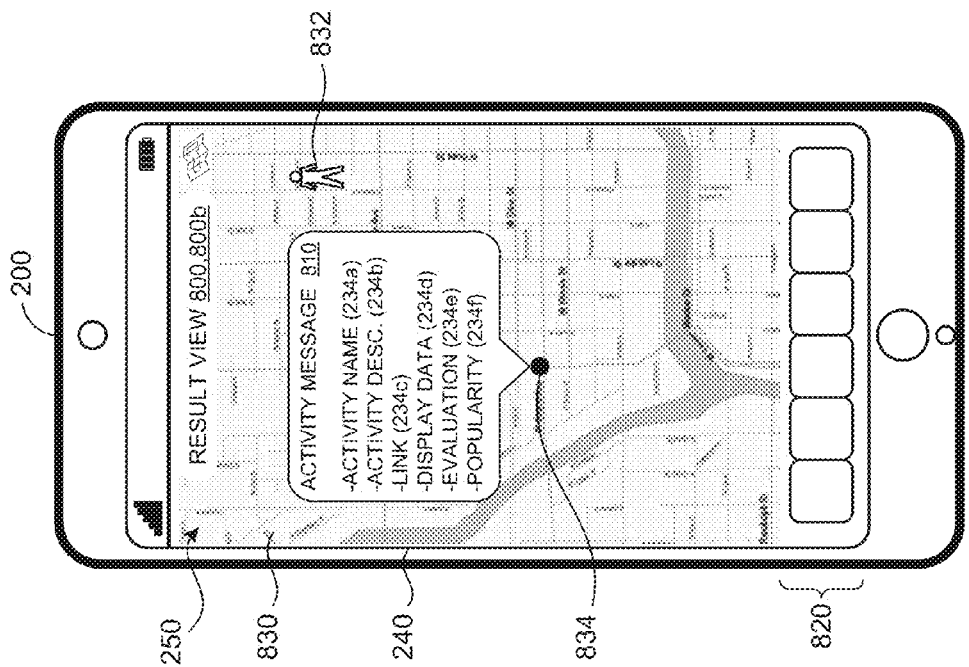
FIG. 8C is a schematic view of an example user device displaying an example result view having a tree-grid view.

Referring to FIG. 8C, in examples where the search results 230 include a recordset of results records 232, the search application 206b may display the search results 230 to the user 10 in a results view 800, 800c that includes a list view 840 of the result records 232 (e.g., in a tabular form). Moreover, the search application 206b may arrange the result records 232 in order based on their evaluation score 234e and/or the popularity score 234f. In some examples, the search application 206b displays the result records 232 in a table grid, and in other examples, the search application 206b displays the result records 232 in a tree-grid (as shown), grouping result records 232 under separate parent nodes by a category or other grouping.

Figure 8E:
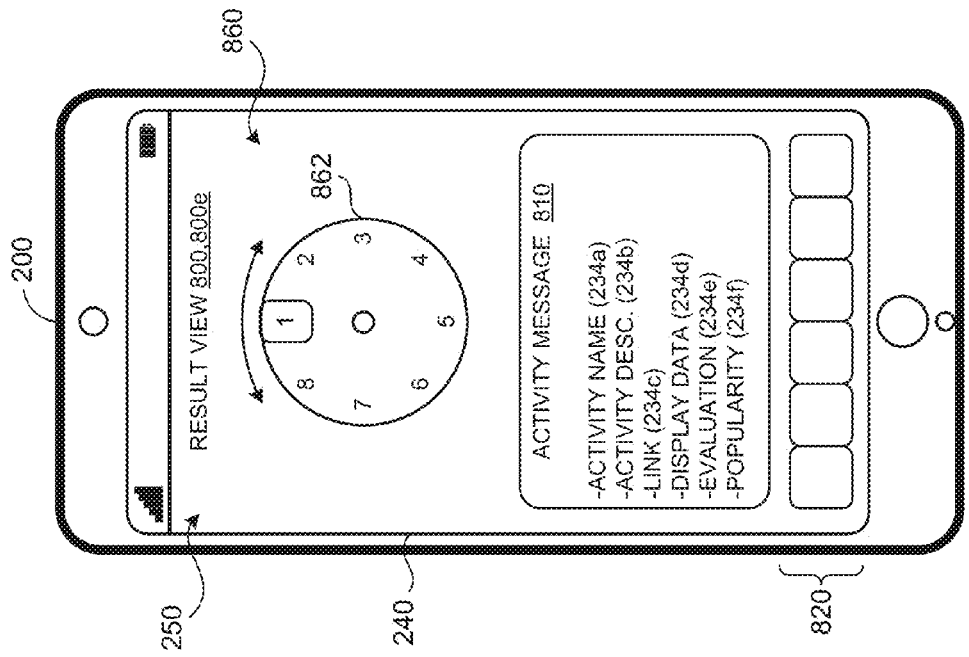
FIG. 8E is a schematic view of an example user device displaying an example result view having a spin-the-wheel view.
Figure 8D:
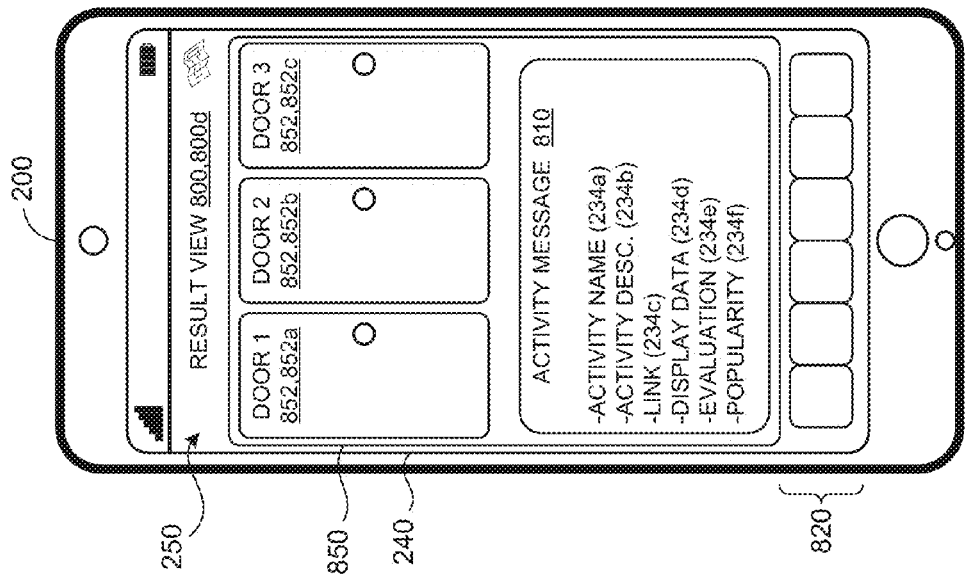
FIG. 8D is a schematic view of an example user device displaying an example result view having a select-a-door view.

FIG. 8D is a schematic view of the user device 200 displaying a result view 800, 800d that includes a select-a-door view 850. The select-a-door view 850 displays doors 852, where each door 852 corresponds to a hidden result record 232. In the example shown, the select-a-door view 850 includes first, second, and third doors 852a-c, but any number of doors 852 may be shown. The search application 206b allows the user 10 to select one door 852. In response to selection of a door 852, the search application 206b displays an activity message 810 including information of the result record 232 (e.g., the activity name 234a, the activity description 234b, the link 234c, the evaluation score 234e, and/or the popularity score 234f) corresponding to the selected door 852.

FIG. 8E is a schematic view of the user device 200 displaying an example result view 800, 800d that includes a spin-the-wheel view 860. The spin-the-wheel view 860 displays a wheel 862 having an enumeration of results records 232 from the search results 230. In the example shown, the wheel 862 includes eight numbers corresponding to eight results records 232, but any number of results records 232 can be enumerated using number, letters, pictures, or other identifiers. In response to the user spinning the wheel 862, the search application 206b randomly selects one of the enumerated result records 232 and displays an activity message 810 including information of the selected result record 232 (e.g., the activity name 234a, the activity description 234b, the link 234c, the evaluation score 234e, and/or the popularity score 234f).

In some implementations, the user 10 can enter feedback in the GUI 250 of the search application 206b, so that the search system 300 can learn whether the suggested activities A were well-received by the user 10. The search system 300 can use the user feedback for future activity selections.

Figure 9:
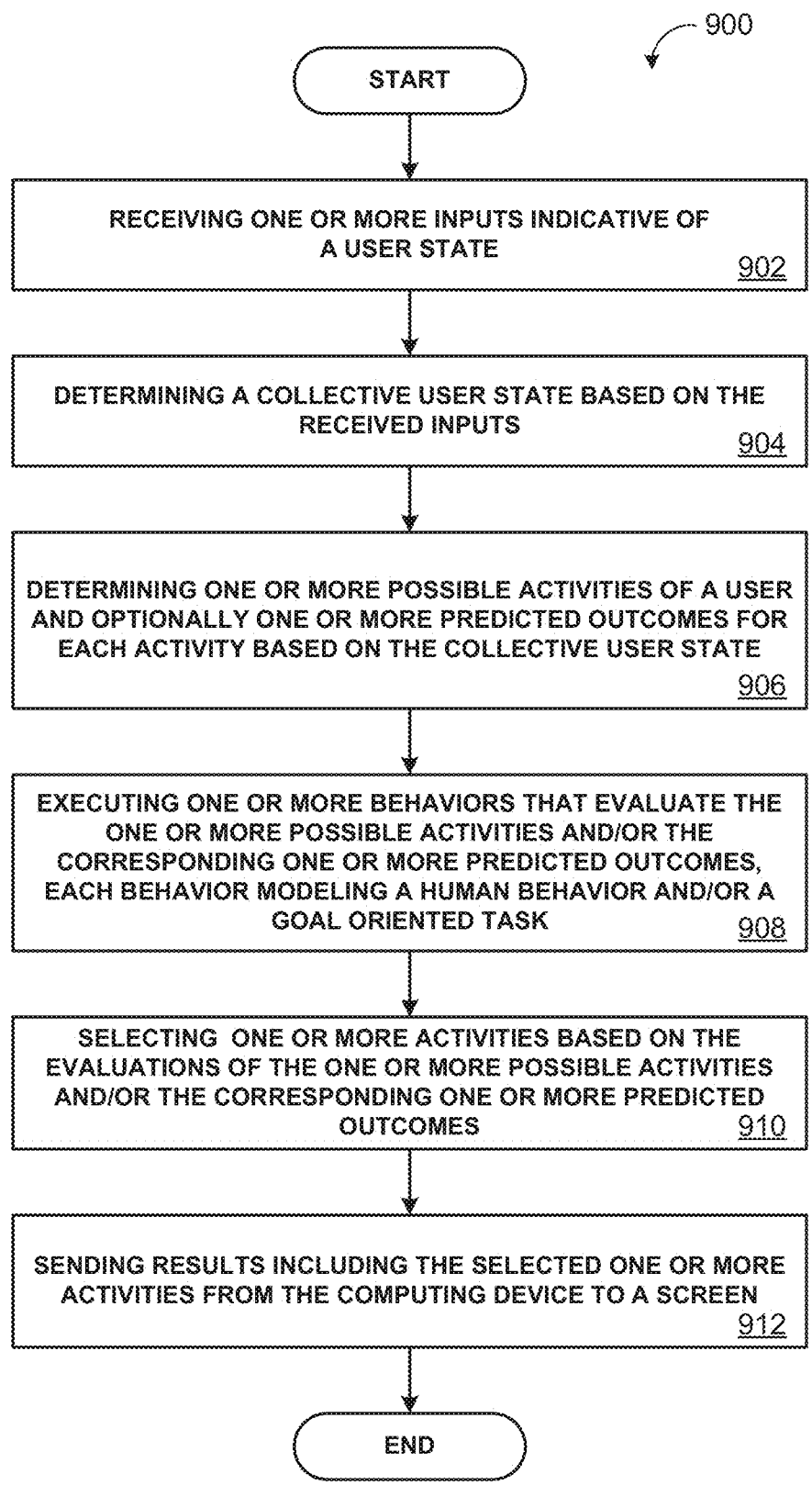
FIG. 9 is a schematic view of an exemplary arrangement of operations for suggesting an activity to one or more users.

FIG. 9 provides example arrangements of operations for a method 900 of performing a search. The method 900 is described with respect to the user device 200 and the search system 300 as illustrated in FIG. 2B. At block 902, the method 900 includes receiving, at a computing device 202, 112, inputs 210 indicative of a user state of the user 10. The inputs 210 include sensor inputs from one or more sensors 208 in communication with the computing device 202, 112 and/or user inputs received from a graphical user interface 250 displayed on a screen 240 in communication with the computing device 202, 112. Moreover, the inputs 210 may include biometric data 212 of the user 10 and environmental data 214 regarding a surrounding of the user 10. At block 904, the method 900 includes determining, using the computing device 112, a collective user state 420 based on the received inputs 210. At block 906, the method 900 includes determining, using the computing device 202, 112, one or more possible activities A, $A_1$-$A_j$ of a user 10 and optionally one or more predicted outcomes O, $O_1$-$O_n$ for each activity A, $A_1$-$A_j$ based on the collective user state 420. The method 900 further includes, at block 908, executing, at the computing device 202, 112, one or more behaviors 610 that evaluate the one or more possible activities A, $A_1$-$A_j$ and/or optionally the corresponding one or more predicted outcomes O, $O_1$-$O_n$. Each behavior 610 models a human behavior and/or a goal oriented task. At block 910, the method 900 includes selecting, using the computing device 202, 112, one or more activities A, $A_1$-$A_j$ based on the evaluations E, $E_1$-$E_n$ of the one or more possible activities A, $A_1$-$A_j$ and/or the corresponding one or more predicted outcomes O, $O_1$-$O_n$; and, at block 912, the method 900 includes sending results 230 including the selected one or more activities A, $A_1$-$A_j$ from the computing device 202, 112 to the screen 240 for display on the screen 240.

In some implementations, the method 900 includes querying one or more remote data sources 130 in communication with the computing device 202, 112 to identify possible activities A, $A_1$-$A_j$ and/or predicted outcomes O, $O_1$-$O_n$. The method 900 may include determining, using the computing device 202, 112, the one or more possible activities A, $A_1$-$A_j$ and the one or more predicted outcomes O, $O_1$-$O_n$ for each activity A based on one or more preferences $P_1$-$P_n$ of the user 10. Each behavior 610 may evaluate an activity A or a corresponding outcome O positively when the activity A or the corresponding outcome O at least partially achieves an objective of the behavior 610. For example, the eating behavior 610a may positively evaluate an eating activity; whereas the sports behavior 610e may negatively evaluate the eating activity. Moreover, each behavior 610 may evaluate an activity A or a corresponding outcome O positively when the activity A or the corresponding outcome O at least partially achieves a user preference $P_1$-$P_n$. In some examples, a first behavior 610 evaluates an activity A or a corresponding outcome O based on an evaluation E by a second behavior 610 of the activity A or the corresponding outcome O. This allows evaluations E of one behavior 610 to be based on evaluations E of another behavior 610. Each behavior 610 may elect to participate or not participate in evaluating the one or more activities A, $A_1$-$A_j$ and/or the one or more predicted outcomes O, $O_1$-$O_n$ for each activity A based on the collective user state 420.

When an input 210 is related to a behavior 610, the method 900 may include incrementing an influence value I associated with the behavior 610. The input 210 may be related to the behavior 610 when the input 210 is of an input type associated with the behavior 610. In some implementations, the evaluations E of each behavior 610 can be weighted based on the influence value I of the corresponding behavior 610. The method 900 may include decrementing the influence value I of each behavior 610 after a threshold period of time. When an influence value I equals zero, the method 900 may include deactivating the corresponding behavior 610. Any behaviors 610 having an influence value I greater than zero may participate in evaluating the activities A or the corresponding outcomes O; and any behaviors 610 having an influence value I equal to zero may not participate in evaluating the activities A or the corresponding outcomes O.

In some implementations, the method 900 includes selecting for the results 230 a threshold number of activities A having the highest evaluations E or a threshold number of activities A having corresponding predicted outcomes O that have the highest evaluations E. The method 900 may include combining selected activities A and sending a combined activity A in the results 230.

The computing device 202, 212 may include a user computer processor 202 of a user device 200 including the screen 240 and/or one or more remote computer processors 112 in communication with the user computer processor 202. For example, the computer device can be the computer processor of a mobile device, a computer processor of an elastically scalable cloud resource, or a combination thereof.

Figure 10:
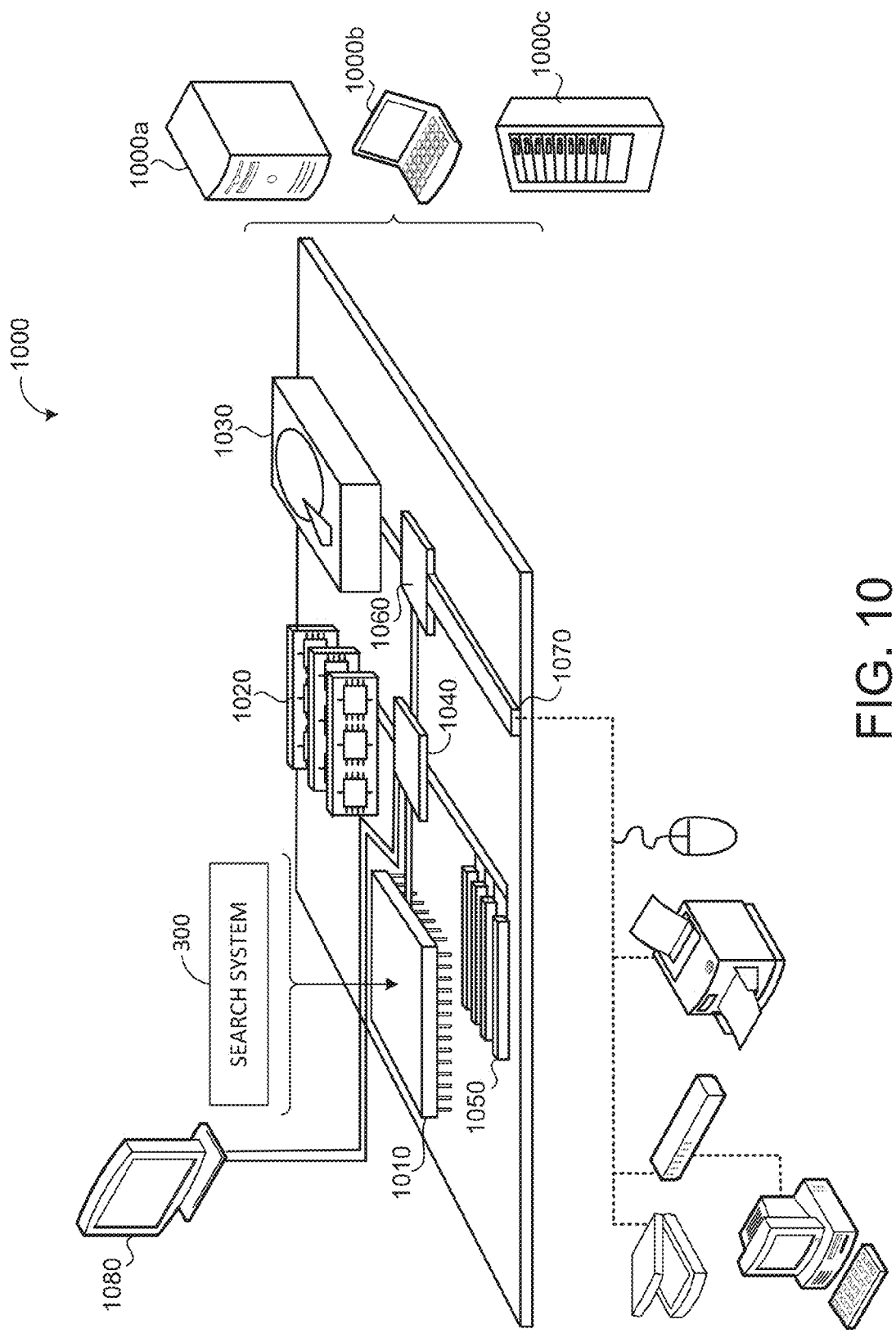
FIG. 10 is schematic view of an example computing device that may be used to implement the systems and methods described in this document.

FIG. 10 is schematic view of an example computing device 1000 that may be used to implement the systems and methods described in this document. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1010, memory 1020, a storage device 1030, a high-speed interface/controller 1040 connecting to the memory 1020 and high-speed expansion ports 1050, and a low speed interface/controller 1060 connecting to low speed bus 1070 and storage device 1030. Each of the components 1010, 1020, 1030, 1040, 1050, and 1060, are interconnected using various busses, and may be mounted on a common motherboard or in other manners as appropriate. The processor 1010 can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and low-speed expansion port 1070. The low-speed expansion port 1070, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1000a or multiple times in a group of such servers 1000a, as a laptop computer 1000b, or as part of a rack server system 1000c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interactivity with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interactivity with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interactivity) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the activities recited in the claims can be performed in a different order and still achieve desirable results.

The invention claimed is:

1. A method comprising:
  receiving, at a computing device, inputs indicative of a user state of a user, the inputs comprising:
    sensor inputs from one or more sensors in communication with the computing device; and/or
    user inputs received from the users through a graphical user interface displayed on one a screen in communication with the computing device;
  determining, using the computing device, a collective user state based on the received inputs;
  determining, using the computing device, one or more possible activities for the user and one or more predicted outcomes for each possible activity based on the collective user state;
  executing, at the computing device, one or more behaviors that evaluate the one or more possible activities and/or the corresponding one or more predicted outcomes, each behavior modeling a human behavior and/or a goal oriented task, for each behavior:
    determining whether any input of the received inputs is associated with the behavior;
    when an input of the received inputs is associated with the behavior, incrementing an influence value associated with the behavior, the input being associated with the behavior when the input is of an input type associated with the behavior; and
    decrementing the influence value of the behavior after a threshold period of time;
    wherein when the influence value of the behavior is greater than zero, the behavior participates in evaluating the one or more possible activities and/or the corresponding one or more predicted outcomes; and
    wherein when the influence value of the behavior equals zero, the behavior does not participate in evaluating the one or more possible activities and/or the corresponding one or more predicted outcomes;
  selecting, using the computing device, one or more activities based on the evaluations of the one or more possible activities and/or the corresponding one or more predicted outcomes; and
  sending results including the selected one or more activities from the computing device to the one or more screens for display on the screen.

2. The method of claim 1, wherein the received inputs comprise biometric data of the user and environmental data regarding a surrounding of the user.

3. The method of claim 1, wherein the one or more sensors comprise at least one of a global positioning system, a temperature sensor, a camera, a three dimensional volumetric point cloud imaging sensor, a fingerprint reader, a blood glucose monitor, a skin PH meter, an inertial measurement unit, a microphone, a blood oxygen meter, a humidistat, or a barometer.

4. The method of claim 1, further comprising querying one or more remote data sources in communication with the computing device to identify the possible activities and/or the one or more predicted outcomes.

5. The method of claim 1, further comprising determining, using the computing device, the one or more possible activities and the one or more predicted outcomes for each activity based on one or more preferences of the user.

6. The method of claim 1, wherein each behavior evaluates a possible activity or a corresponding predicted outcome positively when the possible activity or the corresponding predicted outcome at least partially achieves an objective of the behavior.

7. The method of claim 6, wherein each behavior evaluates a possible activity or a corresponding predicted outcome positively when the possible activity or the corresponding predicted outcome at least partially achieves a user preference stored in non-transitory memory in communication with the computing device.

8. The method of claim 1, wherein a first behavior evaluates a possible activity or a corresponding predicted outcome based on an evaluation by a second behavior of the possible activity or the corresponding predicted outcome.

9. The method of claim 1, wherein each behavior elects to participate or not participate in evaluating the one or more possible activities and/or the one or more predicted outcomes for each possible activity based on the collective user state.

10. The method of claim 1, wherein the evaluations of each behavior is weighted based on the influence value of the corresponding behavior.

11. The method of claim 1, further comprising selecting for the results a threshold number of possible activities having the highest evaluations.

12. The method of claim 1, further comprising selecting for the results a threshold number of possible activities having corresponding predicted outcomes that have the highest evaluations.

13. The method of claim 1, further comprising combining selected activities and sending a combined activity in the results.

14. The method of claim 1, wherein the computing device comprises:
- a user computer processor of a user device including the screen; and/or
- one or more remote computer processors in communication with the user computer processor.

15. A system comprising:
- one or more computing devices; and
- non-transitory memory in communication with the one or more computing devices, the non-transitory memory storing instructions that, when executed by the one or more computing devices, cause the one or more computing devices to perform operations comprising:
  - receiving inputs indicative of a user state of a user, the received inputs comprising:
    - sensor inputs from one or more sensors in communication with the one or more computing devices; and/or
    - user inputs received from a graphical user interface displayed on a screen in communication with the one or more computing devices;
  - determining a collective user state based on the received inputs;
  - determining one or more possible activities for the user and one or more predicted outcomes for each possible activity based on the collective user state;
  - executing one or more behaviors that evaluate the one or more possible activities and/or the corresponding one or more predicted outcomes, each behavior modeling a human behavior and/or a goal oriented task, for each behavior:
    - determining whether any input of the received inputs is associated with the behavior;
    - when an input of the received inputs is associated with the behavior, incrementing an influence value associated with the behavior, the input being associated with the behavior when the input is of an input type associated with the behavior; and
    - decrementing the influence value of the behavior after a threshold period of time;
    - wherein when the influence value of the behavior is greater than zero, the behavior participates in evaluating the one or more possible activities and/or the corresponding one or more predicted outcomes; and
    - wherein when the influence value of the behavior equals zero, the behavior does not participate in evaluating the one or more possible activities and/or the corresponding one or more predicted outcomes;
  - selecting one or more activities based on the evaluations of the one or more possible activities and/or the corresponding one or more predicted outcomes; and
  - sending results including the selected one or more activities to the screen for display on the screen.

16. The system of claim 15, wherein the received inputs comprise biometric data of the user and environmental data regarding a surrounding of the user.

17. The system of claim 15, wherein the one or more sensors comprise at least one of a global positioning system, a temperature sensor, a camera, a three dimensional volumetric point cloud imaging sensor, a fingerprint reader, a blood glucose monitor, a skin PH meter, an inertial measurement unit, a microphone, a blood oxygen meter, a humidistat, or a barometer.

18. The system of claim 15, wherein the operations further comprise querying one or more remote data sources in communication with the computing device to identify the one or more possible activities and/or the one or more predicted outcomes.

19. The system of claim 15, wherein the operations further comprise determining the one or more possible activities and the one or more predicted outcomes for each activity based on one or more preferences of the user.

20. The system of claim 15, wherein each behavior evaluates a possible activity or a corresponding predicted outcome positively when the possible activity or the corresponding predicted outcome at least partially achieves an objective of the behavior.

21. The system of claim 20, wherein each behavior evaluates a possible activity or a corresponding predicted outcome positively when the possible activity or the corresponding predicted outcome at least partially achieves a user preference stored in the non-transitory memory.

22. The system of claim 15, wherein a first behavior evaluates a possible activity or a corresponding predicted outcome based on an evaluation by a second behavior of the possible activity or the corresponding predicted outcome.

23. The system of claim 15, wherein each behavior elects to participate or not participate in evaluating the one or more possible activities and/or the one or more predicted outcomes for each possible activity based on the collective user state.

24. The system of claim 15, wherein the evaluations of each behavior is weighted based on the influence value of the corresponding behavior.

25. The system of claim 15, wherein the operations further comprise selecting for the results a threshold number of possible activities having the highest evaluations.

26. The system of claim 15, wherein the operations further comprise selecting for the results a threshold number of possible activities having corresponding predicted outcomes that have the highest evaluations.

27. The system of claim 15, wherein the operations further comprise combining selected activities and sending a combined activity in the results.

28. The system of claim 15, wherein the one or more computing devices comprise:
- a user computer processor of a user device including the screen; and/or
- one or more remote computer processors in communication with the user computer processor.

* * * * *